(12) United States Patent
Kim et al.

(10) Patent No.: US 9,455,814 B2
(45) Date of Patent: Sep. 27, 2016

(54) METHOD AND APPARATUS FOR TRANSMITTING AND RECEIVING DATA

(71) Applicant: LG ELECTRONICS INC., Seoul (KR)

(72) Inventors: Bonghoe Kim, Anyang-si (KR); Yunjung Yi, Anyang-si (KR); Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 14/387,719

(22) PCT Filed: May 9, 2013

(86) PCT No.: PCT/KR2013/004101
§ 371 (c)(1),
(2) Date: Sep. 24, 2014

(87) PCT Pub. No.: WO2013/169042
PCT Pub. Date: Nov. 14, 2013

(65) Prior Publication Data
US 2015/0036653 A1 Feb. 5, 2015

Related U.S. Application Data

(60) Provisional application No. 61/645,067, filed on May 10, 2012, provisional application No. 61/753,927, filed on Jan. 17, 2013.

(51) Int. Cl.
*H04L 5/00* (2006.01)
*H04L 27/26* (2006.01)
*H04L 1/00* (2006.01)

(52) U.S. Cl.
CPC .......... *H04L 5/0053* (2013.01); *H04L 1/0046* (2013.01); *H04L 1/0072* (2013.01);
(Continued)

(58) Field of Classification Search
CPC . H04L 5/0005; H04L 5/0025; H04L 5/0035; H04L 5/0051; H04L 5/0053; H04L 1/0046; H04L 1/0072; H04L 27/2602
See application file for complete search history.

(56) References Cited

U.S. PATENT DOCUMENTS

2009/0286562 A1* 11/2009 Gorokhov ............ H04B 7/0617
455/501
2010/0260154 A1* 10/2010 Frank ........................ G01S 5/10
370/336

(Continued)

OTHER PUBLICATIONS

Intel Corporation, "Analysis of CRS and PDSCH collisions in Scenarios 3 and 4," 3GPP TSG-RAN WG1 #66, R1-112226, Aug. 2011, 7 pages.

(Continued)

*Primary Examiner* — Kevin Mew
(74) *Attorney, Agent, or Firm* — Lee Hong Degerman Kang & Waimey; Jonathan Kang; Jeffrey Lotspeich

(57) ABSTRACT

A user equipment receives physical downlink shared channel data on a PDSCH in a second subframe from a second serving cell to the user equipment. The second serving cell is activated by the first serving cell, and the second serving cell does not map the PDSCH data to a second RE corresponding to a first resource element of the first subframe mapped with the CRS. The CRS is generated from a pseudo random sequence that is initiated by a cell identifier of the first serving cell and the PDSCH is indicated by an enhanced physical downlink shared channel of the second subframe, and the second RE of the second subframe and the first RE of the first subframe overlap in a time domain and in a frequency domain.

10 Claims, 16 Drawing Sheets

(52) U.S. Cl.
CPC ........... *H04L5/0005* (2013.01); *H04L 5/0025* (2013.01); *H04L 5/0035* (2013.01); *H04L 5/0051* (2013.01); *H04L 27/2602* (2013.01)

(56) References Cited

U.S. PATENT DOCUMENTS

| | | | |
|---|---|---|---|
| 2011/0116572 A1* | 5/2011 | Lee, II | H04B 7/0691 375/295 |
| 2011/0216842 A1* | 9/2011 | Zhang | H04L 5/0051 375/260 |
| 2011/0243009 A1 | 10/2011 | Chandrasekhar et al. | |
| 2011/0292903 A1* | 12/2011 | Jongren | H04L 5/0032 370/329 |
| 2012/0176884 A1* | 7/2012 | Zhang | H04B 7/024 370/203 |
| 2013/0178220 A1* | 7/2013 | Lee | H04L 5/0007 455/450 |
| 2013/0301542 A1* | 11/2013 | Krishnamurthy | H04W 52/50 370/329 |
| 2015/0003351 A1* | 1/2015 | Park | H04J 1/02 370/329 |
| 2015/0016371 A1* | 1/2015 | Lee | H04J 11/0053 370/329 |
| 2015/0023275 A1* | 1/2015 | Kim | H04L 5/0035 370/329 |
| 2015/0173064 A1* | 6/2015 | Kim | H04B 7/26 370/252 |
| 2015/0304086 A1* | 10/2015 | Kim | H04B 17/391 370/329 |

OTHER PUBLICATIONS

ETRI, "PDSCH mapping/CRS pattern indication for multi-cell JP CoMP," 3GPP TSG RAN WG1 Meeting #68, R1-120394, Feb. 2012, 5 pages.

Intel Corporation, "Views on CRS/PDSCH RE Collision in Joint Transmission," 3GPP TSG RAN WG1 Meeting #68, R1-120608, Feb. 2012, 5 pages.

Intel Corporation, "Views on CRS/PDSCH RE Collision in Joint Transmission," 3GPP TSG RAN WG1 Meeting #68bis, R1-121538, Feb. 2012, 5 pages.

PCT International Application No. PCT/KR2013/004101, Written Opinion of the International Searching Authority dated Aug. 28, 2013, 1 page.

\* cited by examiner

FIG. 13
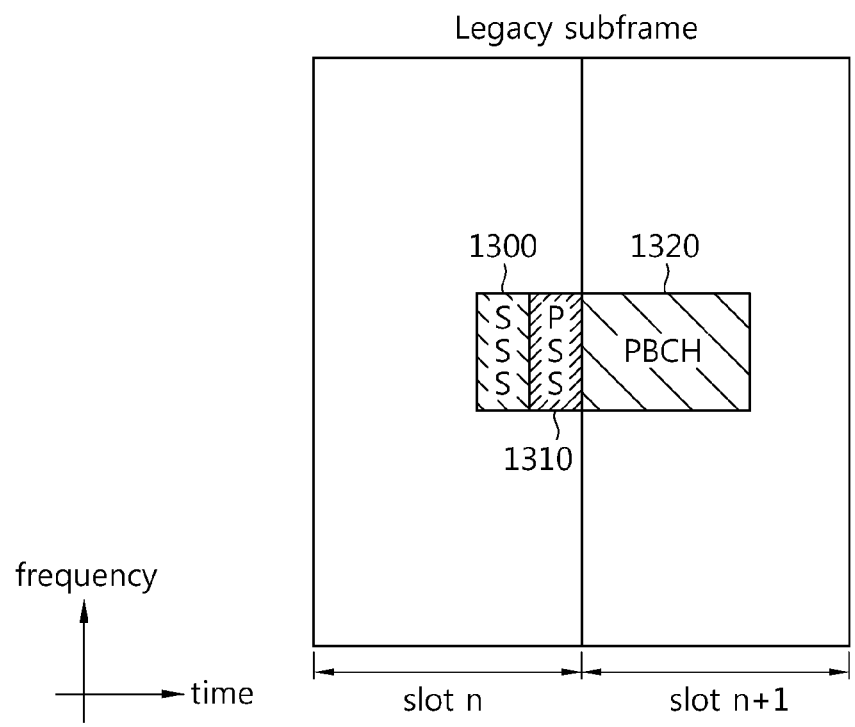
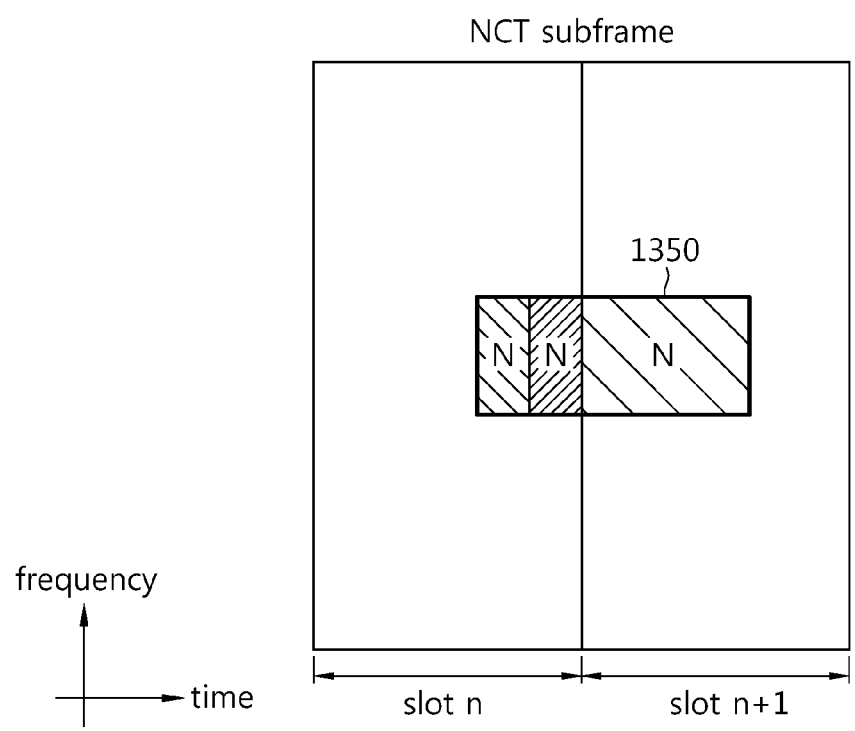

FIG. 14
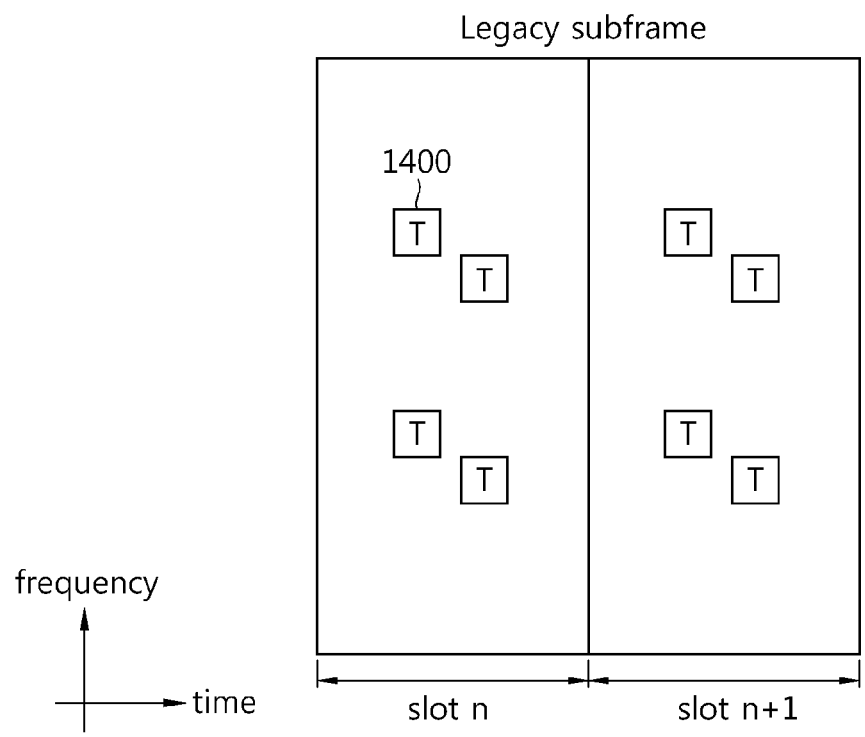
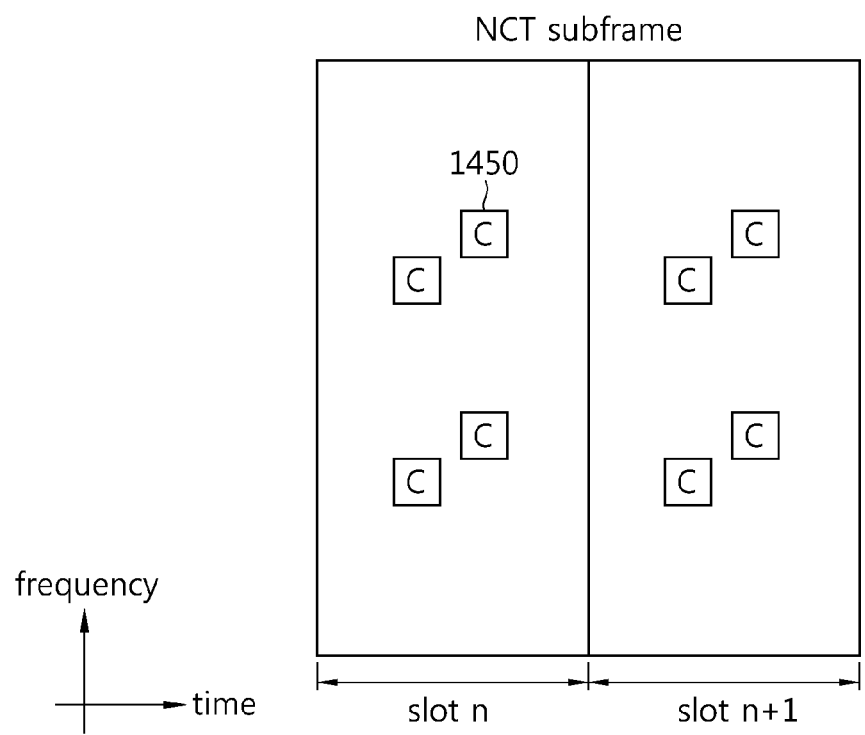

FIG. 15
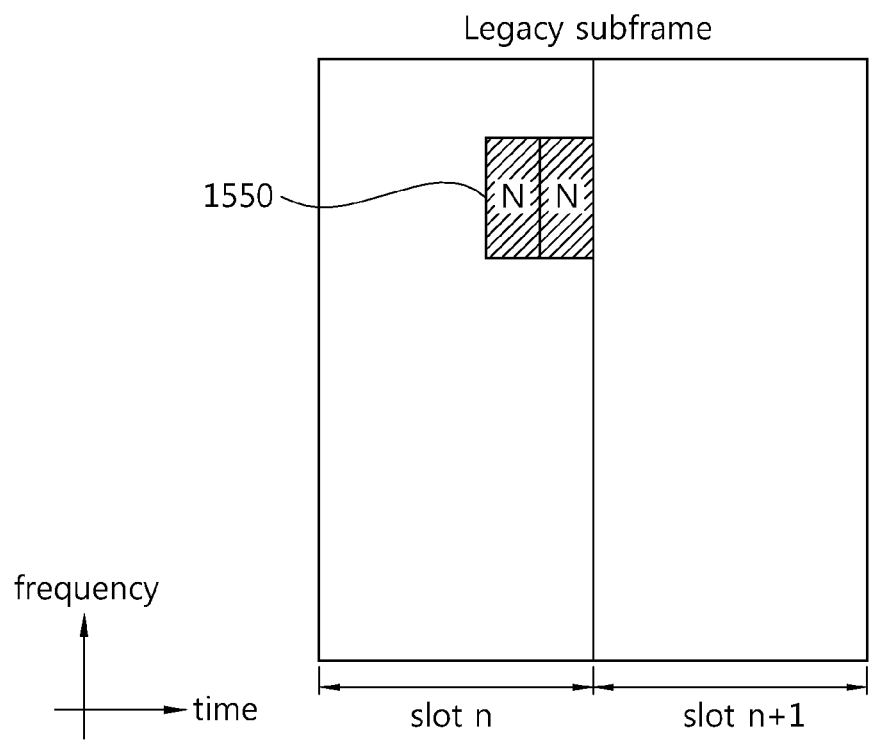
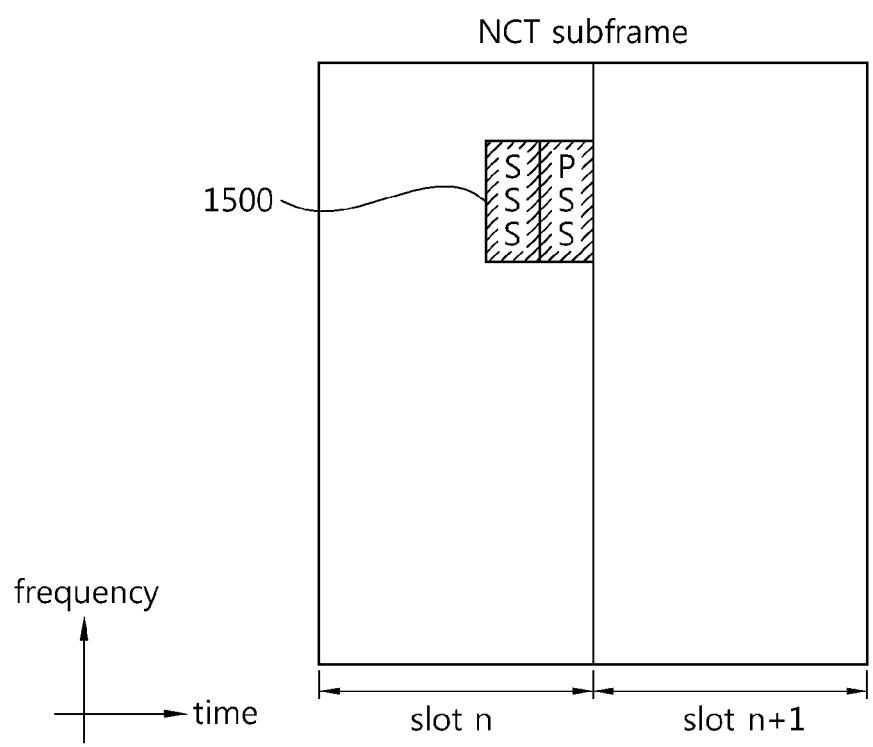

METHOD AND APPARATUS FOR TRANSMITTING AND RECEIVING DATA

CROSS-REFERENCE TO RELATED APPLICATIONS

This application is the National Stage filing under 35 U.S.C. 371 of International Application No. PCT/KR2013/004101, filed on May 9, 2013, which claims the benefit of U.S. Provisional Application Ser. No. 61/645,067, filed on May 10, 2012 and 61/753,927, filed on Jan. 17, 2013, the contents of which are all hereby incorporated by reference herein in their entirety.

TECHNICAL FIELD

The present invention is directed towards wireless communications, and more specifically, to a method and apparatus for transmitting and receiving data.

BACKGROUND ART

Long Term Evolution (LTE) release 12 is intensively in research to enhance performance in light of capacity, transmission coverage, inter-cell coordination and costs. For such performance enhancement, an introduction of various technologies is being discussed such as small cell enhancement, macro cell enhancement, new carrier-type and machine-type communications, in the LTE release 12 technology.

Enhanced capacity and transmission coverage, which are aimed by the LTE release 12, may be achieved by small cell enhancement based on inter-site carrier aggregation, LTE-Wireless Local Area Network (WLAN) incorporation, and macro cell enhancement. As the size of a cell decreases, user equipment's cell-to-cell move frequently happens, and upon user equipment's move, the amount of traffic signaled may increase. To address such problem, the small cell may be optimized by reducing signaling from an Radio Access Network (RAN) to a core network using small cell enhancement.

The New Carrier Type (NCT) is a frame type newly defined differently from the legacy frame configuration. The NCT may be a carrier type optimized for small cells, but may apply to macro cells as well. The NCT reduces overhead that is generated due to transmission of Cell-specific Reference Signal (CRS) and may demodulate a downlink control channel based on the Demodulation Reference Signal (DM-RS). By newly defining NCT, the energy of the base station may be saved or interference that occurs in a Heterogeneous Network (HetNet) may be reduced. Further, by using NCT, reference signal overhead, which is caused when a plurality of downlink link antennas is used to transmit data, may be decreased. More specifically, although the NCT maintains the existing frame structure (e.g., CP length, subframe structure, duplex mode), it may be defined as a carrier having a different structure of a reference signal that is subject to actual transmission, which is not backward compatible (to rel-11 and below UEs).

SUMMARY OF INVENTION

Technical Problem

An object of the present invention is to provide a method for transmitting and receiving data.

Another object of the present invention is to provide an apparatus for transmitting and receiving data.

Technical Solution

According to an aspect of the present invention to achieve the above-described objects of the present invention, a method of receiving data from a plurality of serving cells may comprise the steps of receiving a cell specific reference signal (CRS) in a first subframe from a first serving cell to user equipment and receiving physical downlink shared channel (PDSCH) data on a PDSCH in a second subframe from a second serving cell to the user equipment, wherein the second serving cell is activated by the first serving cell, wherein the second serving cell does not map the PDSCH data to a second RE corresponding to a first resource element (RE) of the first subframe mapped with the CRS, wherein the CRS is generated from a pseudo random sequence that is initiated by a cell identifier of the first serving cell, wherein the PDSCH is indicated by an enhanced physical downlink shared channel (EPDCCH) of the second subframe, and wherein the second RE of the second subframe and the first RE of the first subframe overlap in a time domain and in a frequency domain.

According to another aspect of the present invention to achieve the above-described objects of the present invention, a user equipment receiving data from a plurality of serving cells in a wireless communication system may comprise a process, wherein the processor is configured to receive a cell specific reference signal (CRS) in a first subframe from a first serving cell and to receive PDSCH data on a physical downlink shared channel (PDSCH in a second subframe from a second serving cell, wherein the second serving cell is activated by the first serving cell, wherein the second serving cell does not map the PDSCH data to a second RE corresponding to a first resource element (RE) of the first subframe mapped with the CRS, wherein the CRS is generated from a pseudo random sequence that is initiated by a cell identifier of the first serving cell, wherein the PDSCH is indicated by an enhanced physical downlink shared channel (EPDCCH) of the second subframe, and wherein the second RE of the second subframe and the first RE of the first subframe overlap in a time domain and in a frequency domain.

Advantageous Effects user equipment's demodulation performance may be raised.

DESCRIPTION OF DRAWINGS

FIG. 13 shows the concept of a method of nulling an NCT subframe according to an embodiment of the present invention.

FIG. 14 shows the concept of a method of nulling a legacy subframe and an NCT subframe according to an embodiment of the present invention.

FIG. 15 shows the concept of a method of nulling a legacy subframe according to an embodiment of the present invention.

MODE FOR INVENTION

The wireless device may be stationary or mobile and may be referred to by other terms such as User Equipment (UE), mobile station (MS), mobile terminal (MT), user terminal (UT), subscriber station (SS), personal digital assistant (PDA), wireless modem, handheld device, or terminal Or, the wireless device may be a device that supports only data communication such as Machine-Type Communication (MTC).

The BS (base station) typically refers to a fixed station that communicates with a wireless device and may be referred to by other terms such as eNB (evolved-NodeB), Base Transceiver System (BTS), or Access Point.

Hereinafter, the technology to which the present invention applies in the 3GPP long term evolution (LTE) based on the 3rd Generation Partnership Project (3GPP) Technical Specification (TS) Release 8 or 3GPP LTE-A based on the 3GPP TS release 10 is described. This is merely an example, and the present invention may be applicable to various wireless communication networks. Hereinafter, "LTE" includes "LTE" and/or "LTE-A".

Figure 1:
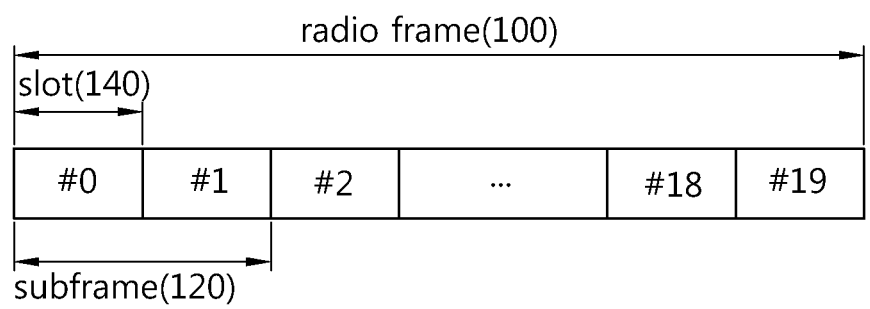
FIG. 1 shows the architecture of a radio frame in the 3rd Generation Partnership Project (3GPP) long term evolution (LTE).

FIG. 1 shows the architecture of a radio frame in the (3rd Generation Partnership Project (3GPP) long term evolution (LTE).

Regarding the architecture of the radio frame 100, refer to Ch. 5, 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 1, the radio frame 100 consists of ten subframes 120, and one subframe 120 consists of two slots 140. In the radio frame 100, the slots 140 may be indexed from slot #0 to slot #19, or the subframes 120 may be indexed from subframe #0 to subframe #9. Subframe #0 may include slot #0 and slot #1.

The time taken to transmit one subframe 120 is referred to as a (transmission time interval) TTI. The TTI may be a basis of scheduling for data transmission. For example, the length of one radio frame 100 may be 10 ms, the length of one subframe 120 may be 1 ms, and the length of one slot 140 may be 0.5 ms.

One slot 140 includes a plurality of orthogonal frequency division multiplexing (OFDM) symbols in the time domain and a plurality of subcarriers in the frequency domain. Since the 3GPP LTE adopts OFDMA for downlink, the OFDM symbol is to represent one symbol period and may be also referred to by other terms depending on multiple access schemes. For example, in case the single carrier-frequency division multiple access (SC-FDMA) is used as the uplink multiple access scheme, it may be called the SC-FDMA symbol. The RB (resource block) is a basis for resource allocation and includes a plurality of consecutive subcarriers in one slot. The resource block is described in more detail with reference to FIG. 2. The architecture of the radio frame 100 shown in FIG. 1 is merely an example of the frame architecture. Accordingly, the number of subframes 120 included in the radio frame 100, the number of slots 140 included in the subframe 120, or the number of OFDM symbols included in the slot 140 may be varied thereby defining new radio frame formats.

According to the 3GPP LTE standards, in case a normal cyclic prefix (CP) is used, one slot includes seven OFDM symbols, and in case an extended CP is used, one slot includes six OFDM symbols.

Wireless communication systems may be generally classified into a FDD (frequency division duplex) scheme and a TDD (time division duplex) scheme. In accordance with the FDD scheme, different frequency bands are adopted for uplink transmission and downlink transmission, respectively. In the TDD scheme, uplink transmission and downlink transmission take up the same frequency band and are performed at different times. In the TDD scheme, channel response is substantially reciprocal. This means that in a given frequency band, a downlink channel response and an uplink channel response are nearly the same. Accordingly, in the TDD-based wireless communication system, the downlink channel response may be advantageously obtained from the uplink channel response. Since in the TDD scheme the entire frequency band is time-divided for uplink transmission and downlink transmission, the downlink transmission by the base station may not be performed simultaneously with the uplink transmission by the user equipment. In the TDD system in which uplink transmission and downlink transmission are distinguished from each other on a per-subframe basis, the uplink transmission and the downlink transmission are performed in different subframes.

Figure 2:
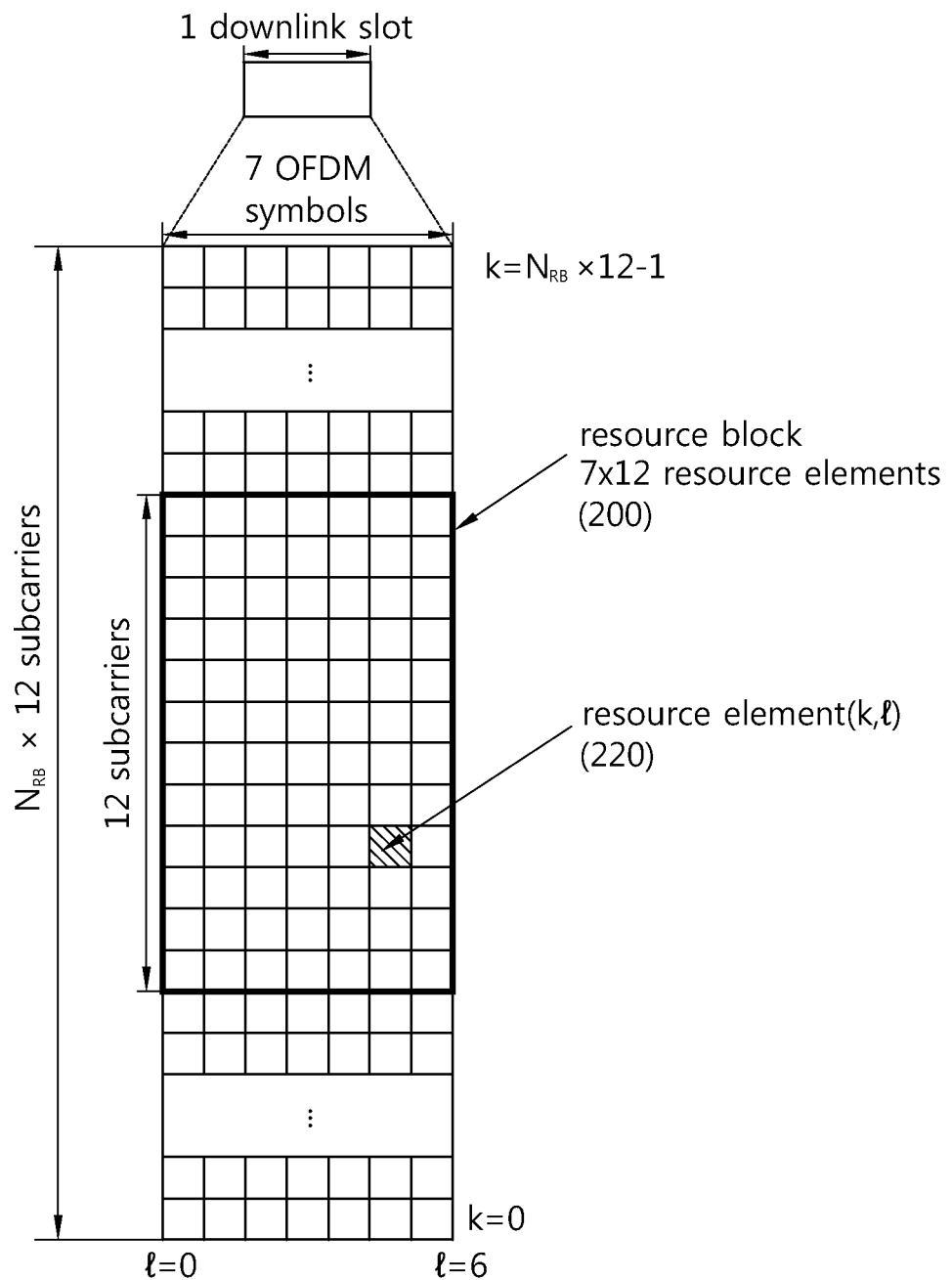
FIG. 2 shows an example of a resource grid for a downlink slot.

FIG. 2 shows an example of a resource grid for a downlink slot.

The downlink slot includes a plurality of OFDM symbols in the time domain and NRB resource blocks in the frequency domain. NRB, the number of resource blocks included in the downlink slot, is dependent upon downlink transmission bandwidth configured in the cell. For example, in the LTE system, NRB may be any one of 6 to 110 depending on a transmission bandwidth used. One resource block 200 includes a plurality of subcarriers in the frequency domain. The structure of an uplink slot may be the same as the structure of the downlink slot.

Each element on the resource grid is referred to as resource element 220. The resource element 220 on the resource grid may be identified by an index pair (k, l) in the slot. Here, k (k=0, . . . , NRBx12−1) is a subcarrier index in the frequency domain, and l (l=0, . . . , 6) is an OFDM symbol index in the time domain.

Here, one resource block 200 includes 7×12 resource elements 220 consisting of seven OFDM symbols in the time domain and twelve subcarriers in the frequency domain, for example. However, the number of OFDM symbols and subcarriers in the resource block 200 is not limited thereto. The number of OFDM symbols and the number of subcarriers may vary depending on the length of CP or frequency spacing. For example, in the case of normal CP, the number of OFDM symbols is 7, and in the case of expanded CP, the number of OFDM symbols is 6. The number of subcarriers in one OFDM symbol may be any one of 128, 256, 512, 1024, 1536, and 2048.

Figure 3:
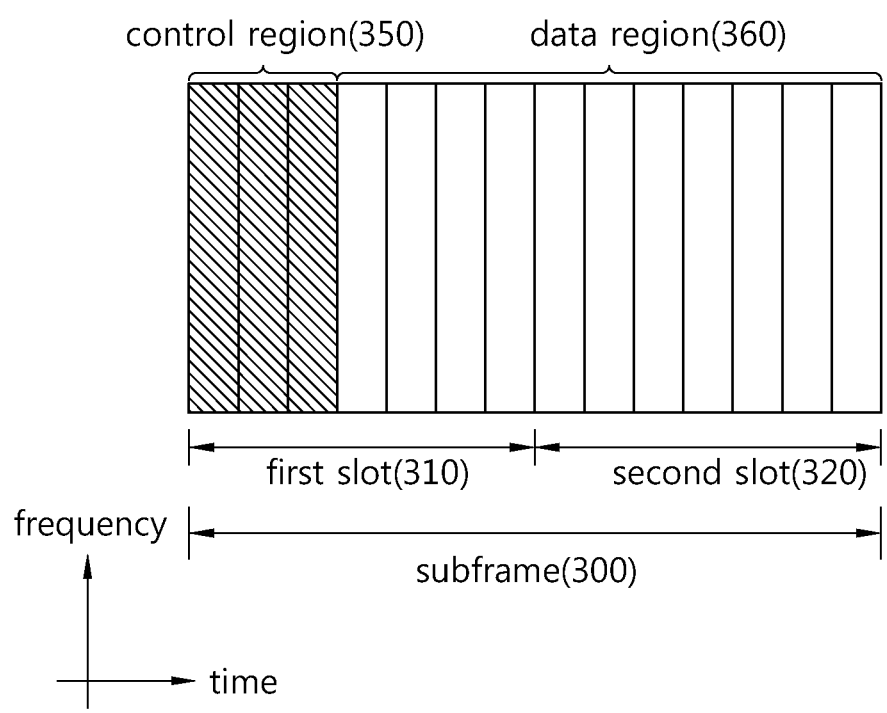
FIG. 3 shows the structure of a downlink subframe.

FIG. 3 shows the structure of a downlink subframe.

The downlink subframe 300 includes two slots 310 and 320 in the time domain, and each slot 310 and 320 includes seven OFDM symbols in the normal CP. The first three OFDM symbols (up to four OFDM symbols for 1.4 Mhz bandwidth) of the first slot 310 in the subframe 300 are a control region 350 to which control channels are assigned, and the remaining OFDM symbols are a data region 360 to which the PDSCH (Physical Downlink Shared Channel).

The PDCCH may transmit resource allocation of DL-SCH (downlink-shared channel) and transmission format, resource allocation information of UL-SCH (uplink shared channel), on-PCH paging information, on-DL-SCH system information, resource allocation of the upper layer control message such as random access response transmitted on PDSCH, a set of transmission power control commands for each UE in any UE group and activation information of VoIP (voice over Internet protocol). A plurality of PDCCH regions may be defined in the control region 350, and the user equipment may monitor a plurality of PDCCHs. The PDCCH is transmitted over aggregation of one or some consecutive CCEs (control channel elements). The CCE is a logical allocation basis used to provide a coding rate depending on the status of the radio channel to the PDCCH. The CCE corresponds to a plurality of resource element groups. The format of PDCCH and the number of bits in available PDCCH are determined depending on the relationship between the number of CCEs and coding rate provided by the CCEs.

The base station determines the format of the PDCCH depending on DCI (downlink control information) to be sent to the user equipment and adds a CRC (cyclic redundancy check) to the control information. In the CRC, depending on the owner or purpose of the PDCCH, a unique identifier (RNTI: radio network temporary identifier) is masked. In the case of PDCCH for specific user equipment, a unique identifier of the user equipment, e.g., C-RNTI (cell-RNTI), may be masked in the CRC. Or, in the case of PDCCH for paging message, a paging indicating identifier, e.g., P-RNTI (paging-RNTI), may be masked in the CRC. In the case o PDCCH for system information block (SIB), a system information identifier, SI-RNTI (system information-RNTI), may be masked in the CRC. To indicate a random access response, which is a response to transmission of a random access preamble of the user equipment, RA-RNTI (random access-RNTI) may be masked in the CRC.

Figure 4:
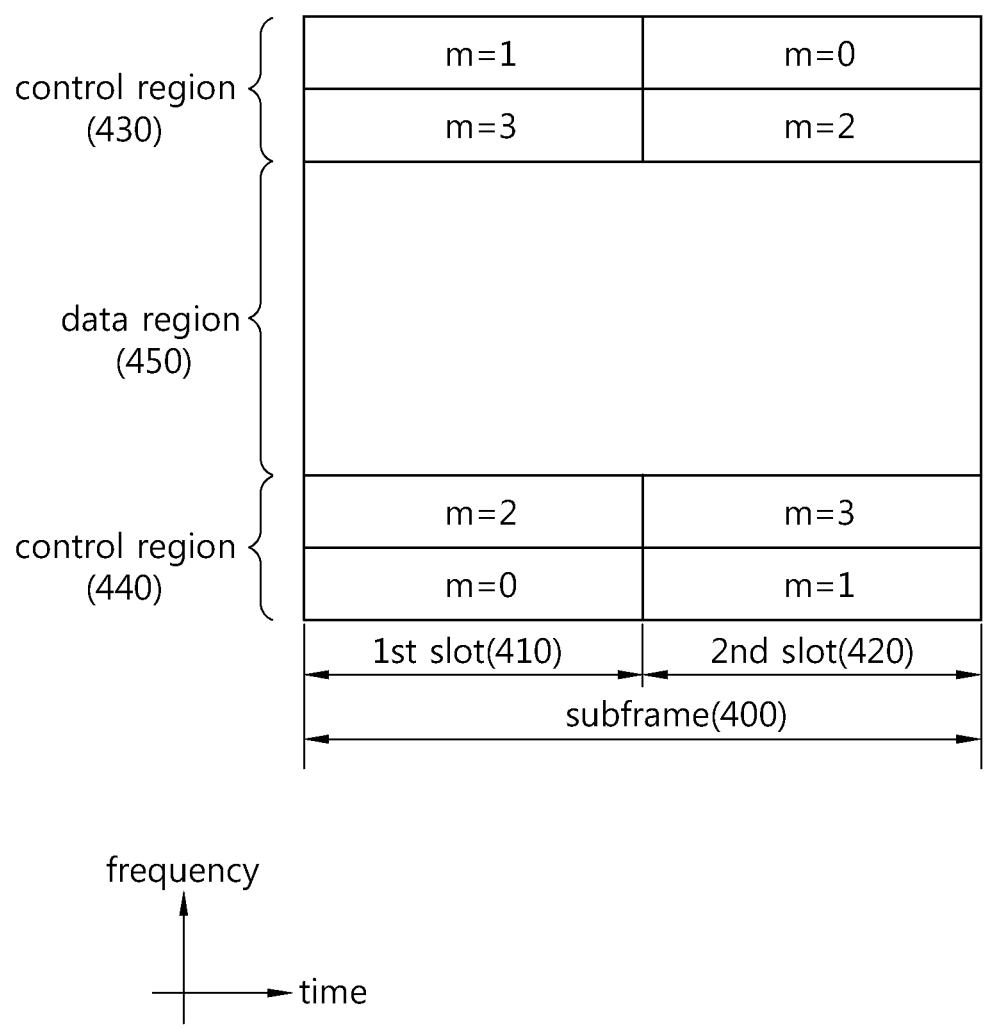
FIG. 4 shows the structure of an uplink subframe.

FIG. 4 shows the structure of an uplink subframe.

The uplink subframe may be divided into control regions 430 and 440 and a data region 450 in the frequency domain. The control regions 430 and 440 are allocated a PUCCH (physical uplink control channel) on which uplink control information is transmitted. The data region 405 is allocated a PUSCH (physical uplink shared channel) on which data is transmitted. When indicated from an upper layer, the user equipment may simultaneously support PUSCH and PUCCH.

PUCCH, for one user equipment, is allocated in a resource block (RB) pair in the subframe 400. The resource blocks in the RB pair occupy different subcarriers in the first slot 410 and the second slot 420. The frequency taken up by the resource block of the RB pair, which is allocated to PUCCH, is varied with respect to slot boundary. This is referred to as RB pair allocated for PUCCH being frequency-hopped at the slot boundary. The user equipment transmits uplink control information through subcarriers different from each other over time, thus leaving frequency diversity gain being able to be obtained. m is a locational index indicating a logical frequency domain location of the RB pair allocated for PUCCH in the subframe.

The uplink control information transmitted on PUCCH includes HARQ (hybrid automatic repeat request) ACK (acknowledgement)/NACK (non-acknowledgement), CQI (channel quality indicator) indicating a downlink channel status, and SR (scheduling request) that is an uplink radio resource allocating request.

The PUSCH is mapped with an UL-SCH (uplink shared channel) that is a transport channel. Uplink data transmitted on PUSCH may be a transport block that is a data block for UL-SCH transmitted during TTI. The transport block may be user information. Or, the uplink data may be multiplexed data. The multiplexed data may be data obtained by multiplexing transport block for UL-SCH with control information. For example, the control information multiplexed with data may include CQI, PMI (precoding matrix indicator), HARQ, and RI (rank indicator). Or, the uplink data may consist of control information only.

Figure 5:
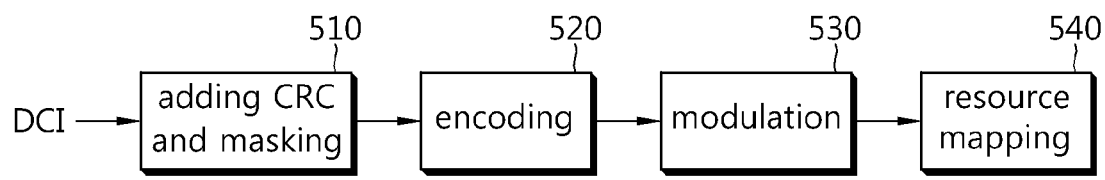
FIG. 5 is a block diagram illustrating a method of generating PDCCH data.

FIG. 5 is a block diagram illustrating a method of generating PDCCH data.

FIG. 5 specifically discloses a method of generating PDCCH data.

The user equipment performs blind decoding for detecting PDCCH. The blind decoding may be conducted based on the identified masked in the CRC of the received PDCCH (which is referred to as candidate PDCCH). The user equipment may identify whether the received PDCCH data is its own control data by performing CRC error check on the received PDCCH data.

The base station determines a PDCCH format depending on DCI to be sent to the user equipment, and then, adds a CRC (Cyclic Redundancy Check) to the DCI, and masks a unique identifier depending on the owner or purpose of the PDCCH, which is referred to as RNTI (Radio Network Temporary Identifier), in the CRC (block 510).

In the case of PDCCH for specific user equipment, the user equipment's unique identifier, e.g., C-RNTI (Cell-RNTI), may be masked in the CRC. Or, in the case of PDCCH for paging messages, a paging indicating identifier, e.g., P-RNTI (Paging-RNTI), may be masked in the CRC. In the case of PDCCH for system information, a system information identifier, SI-RNTI (system information-RNTI), may be masked in the CRC. To indicate a random access response, which is a response to transmission of a random access preamble, a RA-RNTI (random access-RNTI) may be masked in the CRC. To indicate TPC (transmit power control) commands for a plurality of UE, a TPC-RNTI may be masked in the CRC.

If C-RNTI is used, PDCCH conveys control information for corresponding specific user equipment, which is referred to as user equipment (UE)-specific control information, and if other RNTIs are used, PDCCH conveys common control information received by all or a plurality of user equipment in the cell.

The CRC-added DCI is encoded to generate coded data (block 520). The encoding includes channel encoding and rate matching.

The coded data is subjected to modulation to generate modulated symbols (block 530).

The modulated symbols are mapped with physical REs (resource elements) (block 540). The modulated symbols may be mapped with each RE.

The control region in the subframe includes a plurality of CCEs (control channel elements). The CCE is a basis for logical allocation, which is used to provide a coding rate depending on the status of the radio channel to the PDCCH and corresponds to a plurality of REGs (resource element groups). The REG includes a plurality of resource elements. Depending on the relationship between the number of CCEs and the coding rate provided by the CCEs, the format of the PDCCH and the number of bits of available PDCCH are determined.

One REG includes four REs, and one CCE includes 9 REGs. To constitute one PDCCH, {1, 2, 4, 8} CCEs may be used. Each element in {1, 2, 4, 8} is referred to as a CCE aggregation level.

The number of CCEs used for transmission of PDCCH is determined by the base station depending on channel status. For example, one CCE may be used for transmission of PDCCH for a wireless device having a good link channel status. For a wireless device with a poor downlink channel status, eight CCEs may be used for transmission of PDCCH.

The control channel consisting of one or more CCEs is subjected to per-REG basis interleaving and cyclic shift based on a cell ID (identifier), and is then mapped with a physical resource.

Figure 6:
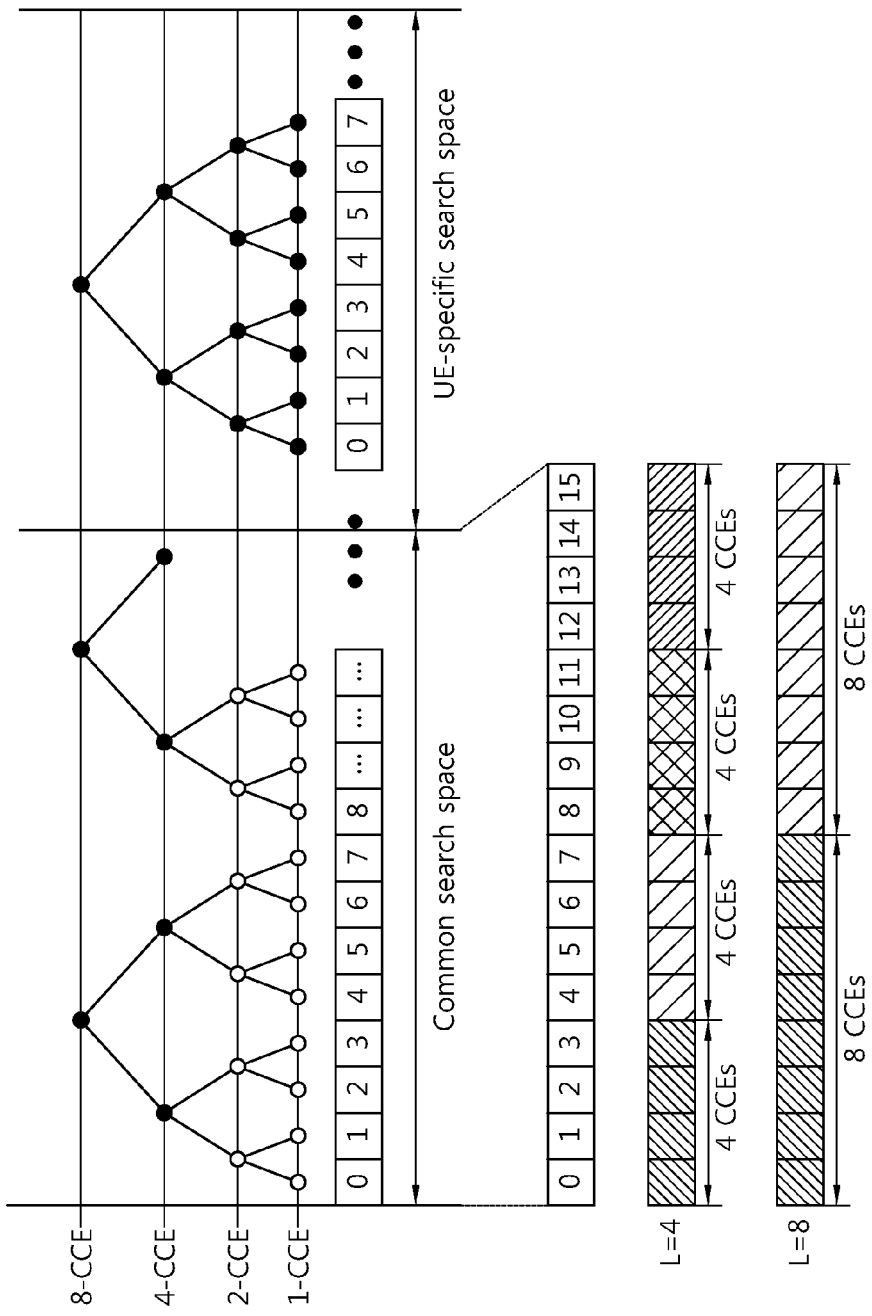
FIG. 6 shows an example of PDCCH monitoring.

FIG. 6 is a view illustrating exemplary PDCCH monitoring. Ch. 9 of 3GPP TS 36.213 V10.2.0 (2011-06) may be referred.

The user equipment may perform blind decoding for detecting PDCCH. The blind decoding is a scheme in which the CRC of the received PDCCH (which is referred to as PDCCH candidate) data is de-masked based on a specific identifier and then CRC error check is performed to verify whether the corresponding PDCCH is its control channel. The user equipment is not aware of in what position of the control region its PDCCH data has been transmitted from the base station using what CCE aggregation level or DCI format.

A plurality of PDCCHs may be transmitted in one subframe. The user equipment monitors the plurality of PDCCHs for each subframe. Here, the monitoring means that the user equipment attempts to decode PDCCH according to the PDCCH format.

In the 3GPP LTE, the user equipment uses a search space to reduce burden that is caused by performing blind decoding. The search space may be a monitoring set of CCEs to search PDCCH. The user equipment may monitor PDCCH based on the search space.

The search space is divided into a common search space and a UE-specific search space. The common search space is a space for searching PDCCH having common control information and consists of 16 CCEs from 0 to 15 and supports PDCCH having CCE aggregation level {4, 8}. However, a PDCCH (DCI format 0, 1A) conveying UE-specific information may be transmitted even in the common search space. The UE-specific search space supports a PDCCH having CCE aggregation level {1, 2, 4, 8}.

Table 1 that follows indicates the numbers of PDCCH candidates monitored by the user equipment.

TABLE 1

| Search space $S_k^{(L)}$ | | | Number of PDCCH candidates $M^{(L)}$ | DCI format |
|---|---|---|---|---|
| Type | Aggregation level $L$ | Size [in CCEs] | | |
| UE-specific | 1 | 6 | 6 | 0, 1, 1A, 1B, 1D, 2, 2A |
|  | 2 | 12 | 6 | |

TABLE 1-continued

| Search space $S_k^{(L)}$ | | | Number of PDCCH candidates $M^{(L)}$ | DCI format |
|---|---|---|---|---|
| Type | Aggregation level $L$ | Size [in CCEs] | | |
|  | 4 | 8 | 2 | |
|  | 8 | 16 | 2 | |
| Common | 4 | 16 | 4 | 0, 1A, 1C, 3/3A |
|  | 8 | 16 | 2 | |

The size of the search space is determined by Table 1 above, and the start point of the search space is differently defined for each of the common search space and UE-specific search space. The start point of the common search space is fixed regardless of sidehaul/bachhaul, but the start point of UE-specific search space may be varied for each subframe depending on the user equipment identifier (e.g., C-RNTI), CCE aggregation level and/or slot number of the radio frame. In case the start point of the UE-specific search space is within the common search space, the UE-specific search space and the common search space may overlap.

In aggregation level L∈{1, 2, 3, 4}, search space S(L)k is defined as a set of PDCCH candidates. The CCE corresponding to PDCCH candidate m of search space S(L)k is given as follows:

$$L \cdot \{(Y_k+m') \bmod \lfloor N_{CCE,k}/L \rfloor\}+i \qquad \text{<Equation 1>}$$

Here, i=0, 1, . . . , L−1, m=0, . . . , M(L)−1, NCCE,k is the number of all CCEs that may be used for transmission of PDCCH in the control region of subframe k. The control region includes a set of CCEs numbered from 0 to NCCE, k−1. M(L) is the number of PDCCH candidates in the CCE aggregation level L in the given search space.

If a CIF (carrier indicator field) is configured for the user equipment, m'=m+M(L)ncif. ncif is a value of the CIF. If no CIF is set for the user equipment, m'=m.

In the common search space, Yk is set as 0 for two aggregation levels, L=4 and L=8. In the UE-specific search space of aggregation level L, variable Yk is defined as follows:

$$Y_k=(A \cdot Y_{k-1}) \bmod D \qquad \text{<Equation 2>}$$

Here, Y−1=nRNTI≠0, A=39827, D=65537, k=floor(ns/2), and ns is a slot number in the radio frame.

When a wireless device monitors PDCCH based on C-RNTI, the DCI format and search space to be monitored are determined depending on a transmission mode of PDSCH. The following table shows an example of C-RNTI configured PDCCH monitoring:

TABLE 2

| Transmission mode | DCI format | Search space | Transmission mode of PDSCH depending on PDCCH |
|---|---|---|---|
| mode 1 | DCI format 1A | common and UE-specific | single antenna port, port 0 |
|  | DCI format 1 | UE-specific | single antenna port, port 0 |
| mode 2 | DCI format 1A | common and UE-specific | transmit diversity |
|  | DCI format 1 | UE-specific | transmit diversity |

TABLE 2-continued

| Transmission mode | DCI format | Search space | Transmission mode of PDSCH depending on PDCCH |
|---|---|---|---|
| mode 3 | DCI format 1A | common and UE-specific | transmit diversity |
| | DCI format 2A | UE-specific | CDD(Cyclic Delay Diversity) or transmit diversity |
| mode 4 | DCI format 1A | common and UE-specific | transmit diversity |
| | DCI format 2 | UE-specific | closed-loop spatial multiplexing |
| mode 5 | DCI format 1A | common and UE-specific | transmit diversity |
| | DCI format 1D | UE-specific | MU-MIMO(Multi-user Multiple Input Multiple Output) |
| mode 6 | DCI format 1A | common and UE-specific | transmit diversity |
| | DCI format 1B | UE-specific | closed-loop spatial multiplexing |
| mode 7 | DCI format 1A | common and UE-specific | If no. of PBCH transmission ports is 1, single antenna port, port 0, otherwise, transmit diversity |
| | DCI format 1 | UE-specific | Single antenna port, port 5 |
| mode 8 | DCI format 1A | common and UE-specific | If no. of PBCH transmission ports is 1, single antenna port, port 0, otherwise, transmit diversity |
| | DCI format 2B | UE-specific | Dual layer transmit (port 7 or 8), or single antenna port, port 7 or 8 |

Purposes of DCI formats are classified as follows.

TABLE 3

| DCI format | Details |
|---|---|
| DCI format 0 | Used for PUSCH scheduling |
| DCI format 1 | Used for scheduling one PDSCH codeword |
| DCI format 1A | Used for compact scheduling of one PDSCH codeword and random access process |
| DCI format 1B | Used for compact scheduling of one PDSCH codeword with precoding information |
| DCI format 1C | Used for very compact scheduling of one PDSCH codeword |
| DCI format 1D | Used for compact scheduling of one PDSCH codeword with precoding and power offset information |
| DCI format 2 | Used for PDSCH scheduling set in closed-loop multiplexing mode |
| DCI format 2A | Used for PDSCH scheduling of a plurality of user equipment set in open-loop multiplexing mode |
| DCI format 3 | Used for transmission of TPC command and PUCCH with two-bit power adjustments |
| DCI format 3A | Used for transmission of TPC command of PUSCH and PUCCH with one-bit power adjustment |

Figure 7:
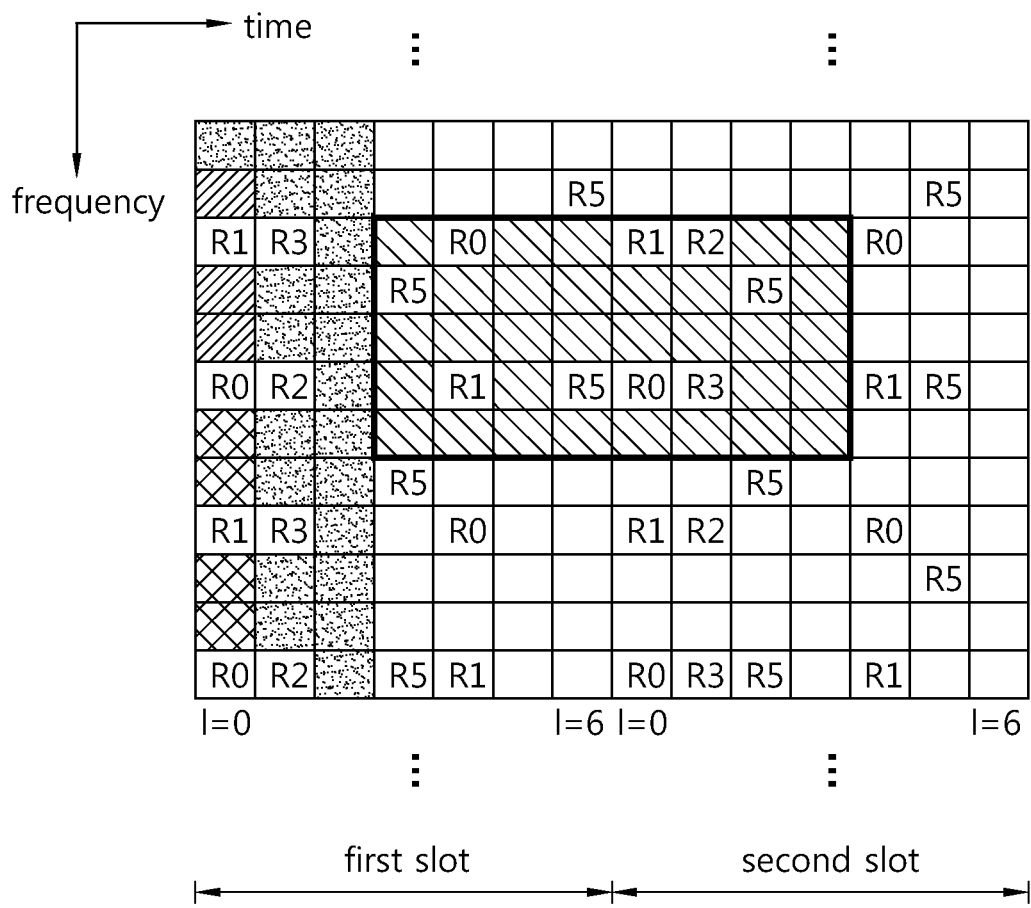
FIG. 7 shows an example of an arrangement of a reference signal and a control channel in a 3GPP LTE downlink subframe.

FIG. 7 shows an example of arranging reference signals and control channels in a 3GPP LTE downlink subframe.

The control region (or PDCCH region) includes first three OFDM symbols and the data region where PDSCH is transmitted includes the remaining OFDM symbols.

PCFICH, PHICH and/or PDCCH are transmitted in the control region.

PHICH (physical HARQ ACK/NACK indicator channel) may transmit HARQ (hybrid automatic retransmission request) information in response to uplink transmission.

PCFICH (physical control format indicator channel) may indicate information on the number of OFDM symbols allocated to the PDCCH. For example, the CIF (control format indicator) of PCFICH may indicate three OFDM symbols. The region other than the resource for transmitting PCFICH and/or PHICH in the control region is a PDCCH region for the user equipment to monitor PDCCH.

Various reference signals may also be transmitted in the subframe.

The CRS (cell-specific reference signal) is a reference signal that may be received by all user equipment in the cell and may be transmitted over the entire downlink frequency band. In FIG. 6, 'R0' refers to a RE (resource element) for transmitting CRS for the first antenna port, 'R1' refers to an RE for transmitting CRS for the second antenna port, 'R2' refers to an RE for transmitting CRS for the third antenna port, and 'R3' is an RE for transmitting CRS for the fourth antenna port.

The RS sequence $r_{l,n_s}(m)$ for CRS is defined as follows:

$$r_{l,ns}(m) = \frac{1}{\sqrt{2}}(1 - 2 \cdot c(2m)) + j\frac{1}{\sqrt{2}}(1 - 2 \cdot c(2m+1)) \qquad \text{<Equation 3>}$$

Here, $m=0, 1, \ldots, 2N_{RB}^{max,DL}-1$, $N_{RB}^{max,DL}$ is the maximum number of RBs, ns is a slot number in the radio frame, and l is an OFDM symbol number in the slot.

The pseudo-random sequence) c(i) is defined by a gold sequence with a length of 31 as follows:

$$c(n)=(x_1(n+Nc)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad \text{<Equation 4>}$$

Here, Nc=1600, the first m-sequence is initiated so that x1(0)=1, x1(n)=0, m=1, 2, . . . , 30. The second m-sequence is initiated, at the start of each OFDM symbol, as $$c_{init}=2^{10} \cdot (7 \cdot (n_s+1)+l+1) \cdot (2 \cdot N_{ID}^{cell}+1)+2 \cdot N_{ID}^{cell}+N_{CP}.$$

$N_{ID}^{cell}$ is the PCI (physical cell identity) of the cell, and at the normal CP, $N_{CP}=1$, and at the expanded CP, $N_{CP}=0$.

Further, a URS (UE-specific Reference Signal) may be transmitted in the subframe. Although the CRS is transmitted in the entire region of the subframe, the URS is transmitted in the data region of the subframe and is used for demodulation of a corresponding PDSCH. In the drawings, 'R5' indicates an RE where the URS is transmitted. The DM-RS is a reference signal used for demodulation of EPDCCH data.

The URS may be transmitted in a RB resource-mapped with the corresponding PDSCH data. In FIG. 6, R5, in addition to the region where the PDSCH is transmitted, is marked as well, but this is provided to indicate the position of the RE to which the URS is mapped.

The URS is used by only the user equipment that receives the corresponding PDSCH. The RS sequence for the URS, $r_{l,n_s}(m)$, is the same as Equation 3. At this time, $m=0, 1, \ldots, 12N_{RB}^{PDSCH}-1$, and NPDSCH,RB is the number of RBs for transmission of the corresponding PDSCH. The pseudo-random number sequence generator is initiated, at the start of each subframe, as $c_{init}=(\lfloor n_s/2 \rfloor+1) \cdot (2N_{ID}^{cell}+1) \cdot 2^{16}+n_{RNTI}$. $n_{RNTI}$ is an identifier of the wireless device.

The above-described initiating method is associated with the case where the URS is transmitted through a single antenna, and when the URS is transmitted through a multi-antenna, the pseudo-random number sequence generator is initiated, at the start of each subframe, as $c_{init}=(\lfloor n_s/2 \rfloor+1) \cdot (2n_{ID}^{(nSCID)}+1) \cdot 2^{16}+n_{SCID}$. $n_{SCID}$ is a parameter obtained from a DL grant (e.g., DCI format 2B or 2C) related to PDSCH transmission.

The URS supports MIMO (Multiple Input Multiple Output) transmission. The RS sequence for URS in accordance with the antenna port or layer may be spread in a spread sequence as follows:

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

The layer may be defined as an information path entered to a precoder. The rank is the number of non-zero eigenvalues of a MIMO channel matrix and is the same as the number of layers or the number of spatial streams. The layer may correspond to a spread sequence that is applied to URSs and/or antenna ports for distinguishing the URSs from each other.

Meanwhile, the PDCCH is monitored within a limited region that is the control region of the subframe, and the CRS transmitted on the entire band is used for demodulation of the PDCCH. As the type of control data is diversified and the amount of control data is increased, the flexibility of scheduling is deteriorated only with the existing PDCCH. Further, EPDCCH (enhanced PDCCH) is introduced to reduce overhead that is caused due to transmission of CRS.

Figure 8:
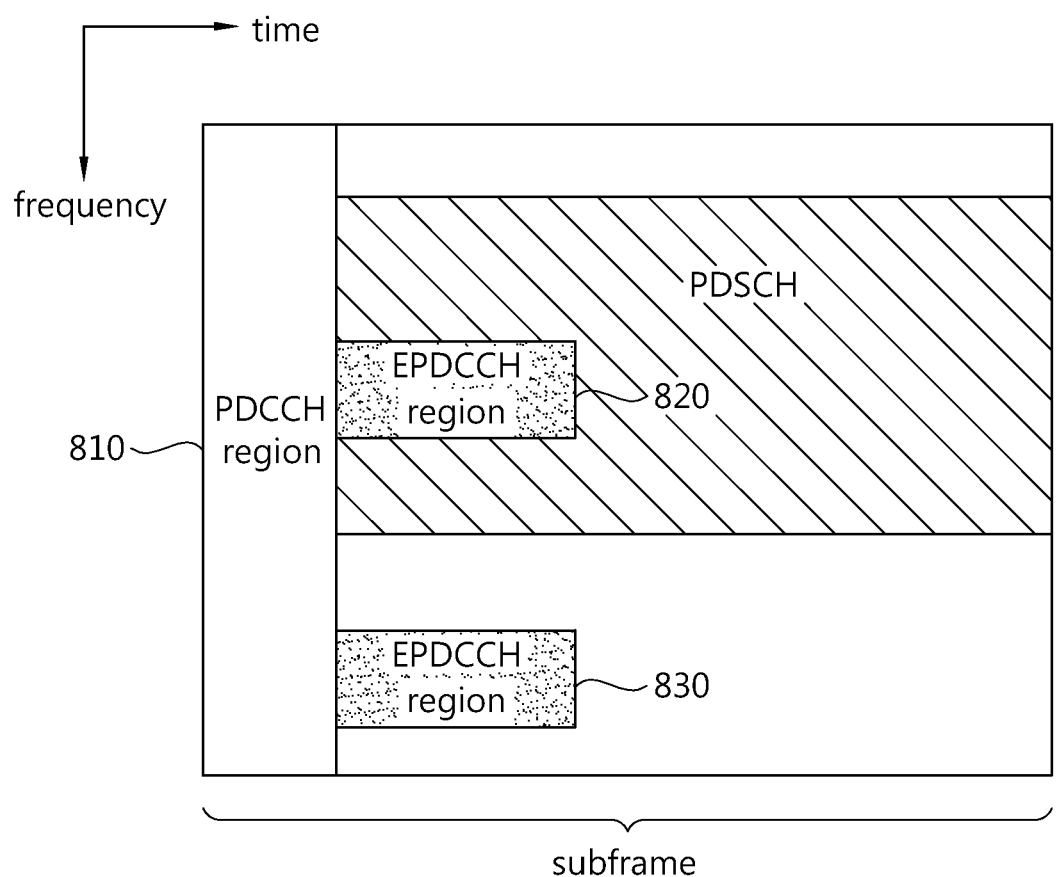
FIG. 8 shows an example of a subframe having an EPDCCH.

FIG. 8 shows an exemplary subframe having an EPDCCH.

The subframe may include zero or one PDCCH region 810 and zero or one or more EPDCCH regions 820 and 830.

The EPDCCH regions 820 and 830 are regions where the user equipment monitors the EPDCCH. The PDCCH region 810 is positioned in the first, up to four OFDM symbols of the subframe. However, the EPDCCH regions 820 and 830 may be flexibly scheduled in the OFDM symbols subsequent to the PDCCH region 810.

One or more EPDCCH regions 820 and 830 are designated for the user equipment, and the user equipment may monitor EPDCCH data in the designated EPDCCH regions 820 and 830.

The number/position/size of the EPDCCH regions 820 and 830 and/or information on the subframe to monitor the EPDCCH may be notified from the base station to the user equipment through a RRC (radio resource control) message.

The PDCCH may be demodulated based on the CRS in the PDCCH region 810. In the EPDCCH regions 820 and 830, a DM-RS, not a CRS, may be defined for demodulation of the EPDCCH. The DM-RS may be transmitted in the corresponding EPDCCH regions 820 and 830.

The RS sequence for DM-RS is the same as Equation 3. At this time, $m=0, 1, \ldots, 12N_{RB}^{max,DL}-1$, and $N_{RB}^{max,DL}$ RB is the maximum number of RBs. The pseudo-random number sequence generator may be initiated, at the start of each subframe, as $c_{init}=(\lfloor n_s/2 \rfloor+1) \cdot (2n_{ID,i}^{EPDCCH}+1) \cdot 2^{16}+n_{SCID}^{EPDCCH}$. ns is a slot number in the radio frame, $n_{ID,i}^{EPDCCH}$ is a cell index associated with a corresponding EPDCCH region, and $n_{SCID}^{EPDCCH}$ is a parameter given from upper layer signaling.

Each EPDCCH region 820 and 830 may be used for scheduling for different cells. For example, the EPDCCH in the EPDCCH region 820 may carry scheduling information for the first cell, and the EPDCCH in the EPDCCH region 830 may carry scheduling information for the second cell.

When the EPDCCH is transmitted through a multi-antenna in the EPDCCH regions 820 and 830, the DM-RS in the EPDCCH regions 820 and 830 may have the same precoding applied thereto as applies to the EPDCCH.

Compared with the PDCCH using CCE as the basis of the transmission resource, the basis of the transmission resource for the EPDCCH is referred to as a CCCE (Enhanced Control Channel Element). The aggregation level may be defined as the basis of the resource for monitoring the EPDCCH. For example, assuming that one ECCE is the minimum resource for EPDCCH, the aggregation level L={1, 2, 4, 8, 16} may be defined.

Hereinafter, the search space may correspond to the EPDCCH region. In the search space, one or more EPDCCH candidates may be monitored for every one or more aggregation levels.

Figure 9:
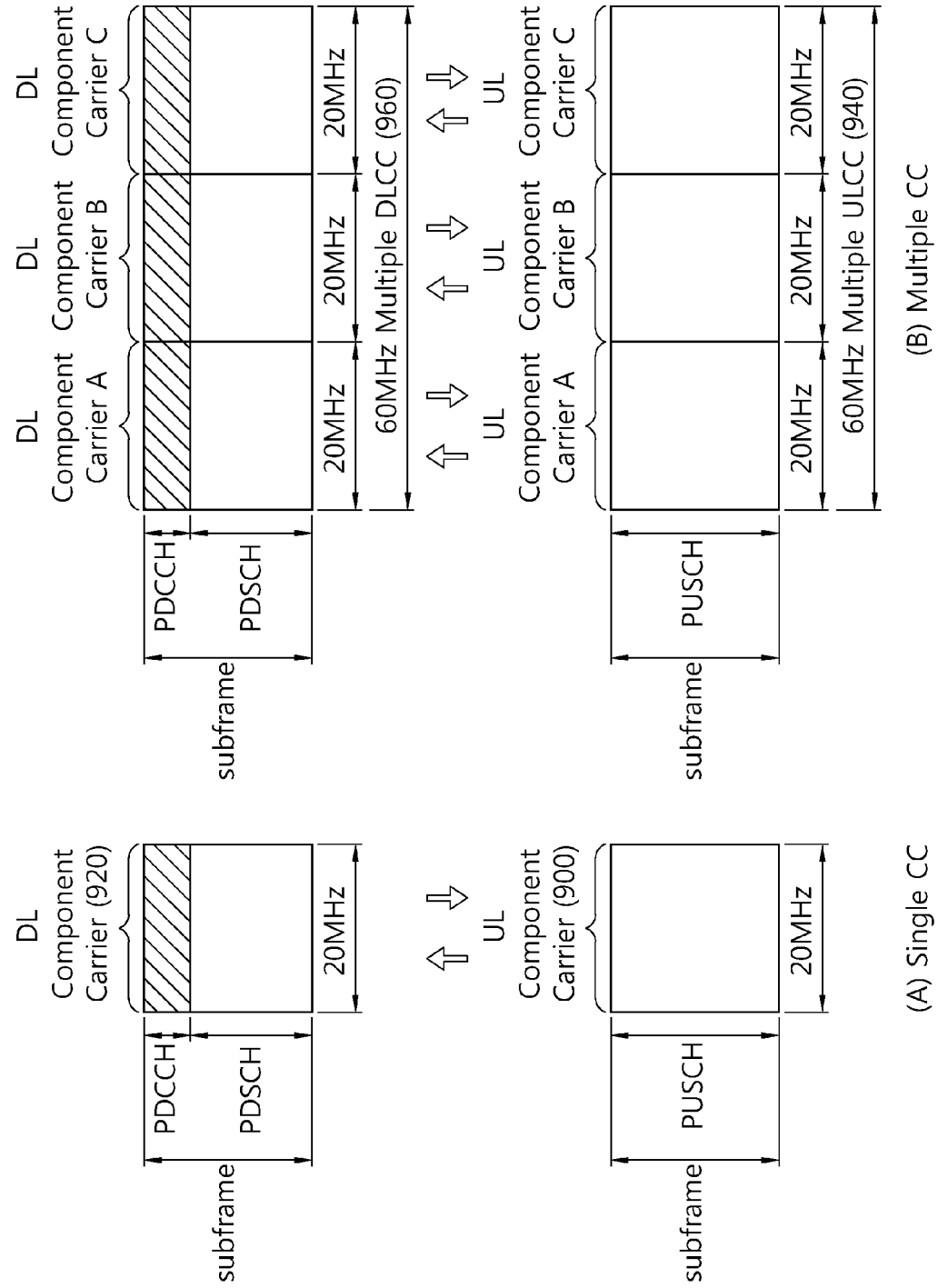
FIG. 9 shows the concept of carrier aggregation.

FIG. 9 illustrates the concept of the carrier aggregation.

FIG. 9(A) shows a single component carrier (CC). One CC may be 20 MH uplink frequency band 900 and downlink frequency band 920. FIG. 9(B) shows multiple component carriers (CCs). The multiple CCs may be, e.g., 60 MHz uplink frequency band 940 and downlink frequency band 960 that are obtained by aggregating the 20 MHz uplink frequency band and downlink frequency band.

The base station may perform carrier aggregation and may transmit data to the user equipment through a plurality of downlink CCs. The base station may enable downlink transmission using N downlink CCs. At this time, if the user equipment may receive downlink data only through M (M is a natural number that is equal to or less than N) downlink CCs, the user equipment may receive only the downlink data that is transmitted through the M downlink CCs from the base station.

Additionally, the base station may set a frequency bandwidth corresponding to L (L is a natural number that is equal to or less than M and N) downlink CCs as a main CC and may operate it. The user equipment may first monitor and receive data transmitted from the base station through the main CC. In case the carrier aggregation is performed, CCs may be divided in accordance with cells.

In case carrier aggregation is conducted using CCs of a P-cell (primary cell) and CCs of an S-cell (secondary cell), a carrier corresponding to the P-cell CC among the carriers used on downlink and uplink is denoted as a PCC (primary cell component carrier), and a carrier corresponding to the S-cell CC is denoted as an SCC (secondary cell component carrier).

Figure 10:
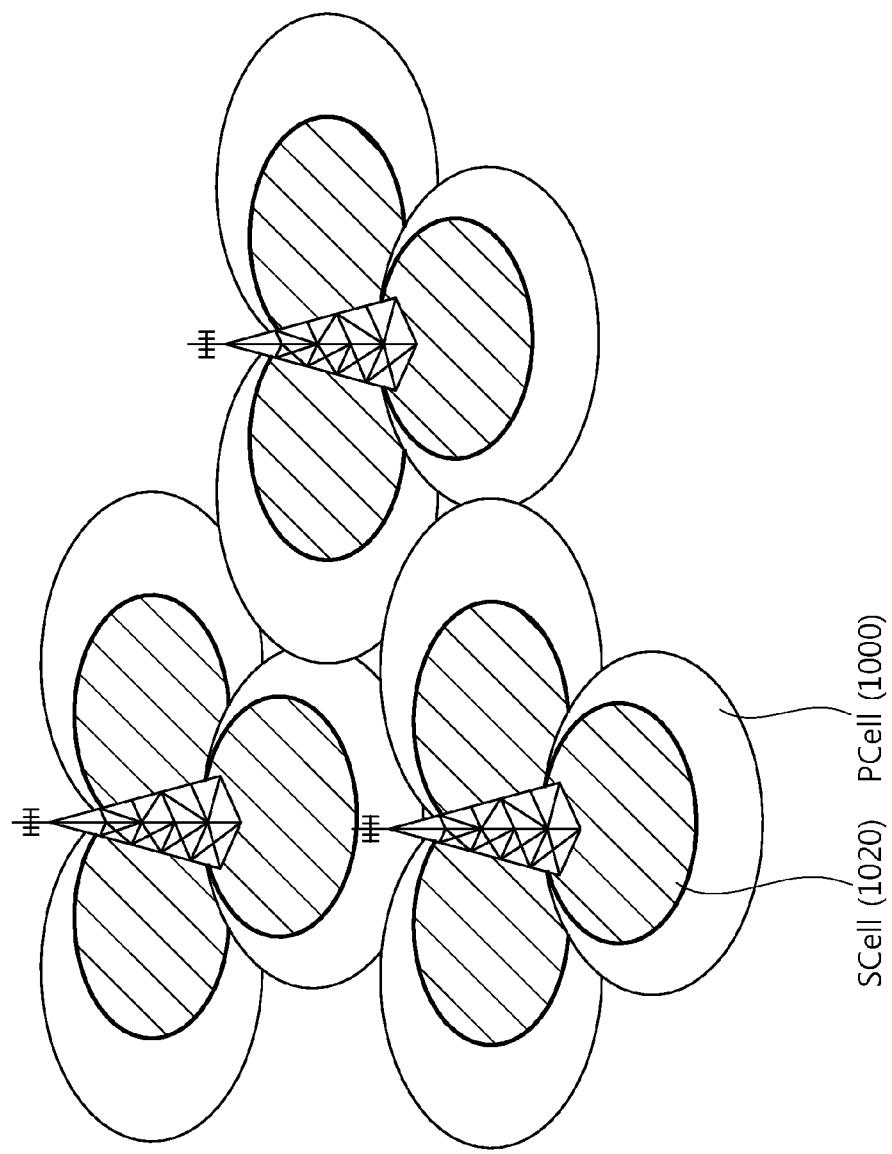
FIG. 10 shows the concept of a P-cell and an S-cell.

FIG. 10 shows the concept of a P-cell and an S-cell.

Referring to 10, the base station may perform carrier aggregation based on the PCC of the P-cell 1000 and SCCs of one or more S-cells 1020. In case two or more cells are present, the base station may determine one cell as the P-cell 1000 while determining the remaining cells as the S-cells 1020. The base station may aggregate CCs of the determined P-cell 1000 and S-cells 1020 and may transmit data to the user equipment using the aggregated frequency bandwidth. The user equipment may also transmit data to the base station using the aggregated frequency bandwidth. The arrangement of the P-cell 1000 and S-cells 1020 as shown in FIG. 10 is an example of scenarios for arranging the P-cell 1000 and S-cells 1020 and is associated with the case where the data transmission range based on the PCC of the P-cell 1000 is larger than the data transmission range based on the SCC of the S-cell 1020.

The user equipment may perform RRC (radio resource control) connection with the network through the PCC of the P-cell 1000. Further, the user equipment may attempt to gain random access to the base station through a PRACH (physical random access channel) based on the signal signaled through the PCC. That is, the user equipment may perform an initial connection establishment process or connection reestablishment process to the base station through the PCC in a carrier aggregation environment.

The SCC of the S-cell 1020 may be used to provide an additional radio resource. To perform carrier aggregation for adding the SCC to the PCC, the user equipment needs to fulfill neighbor cell measurement for obtaining information on the neighbor cell. Based on the neighbor cell measurement fulfilled by the user equipment, the base station may determine whether to aggregate the SCC to the PCC.

The base station may transmit PDCCH data to the user equipment through the PCC. The PDCCH data may include PDSCH data allocation information transmitted through the downlink PCC band and SCC band and information for authorizing data transmission through uplink.

The P-cell 1000 and the S-cell 1020 perform carrier aggregation through operations such as configuration and activation and may transmit and receive data through the aggregated frequency band.

Figure 11:
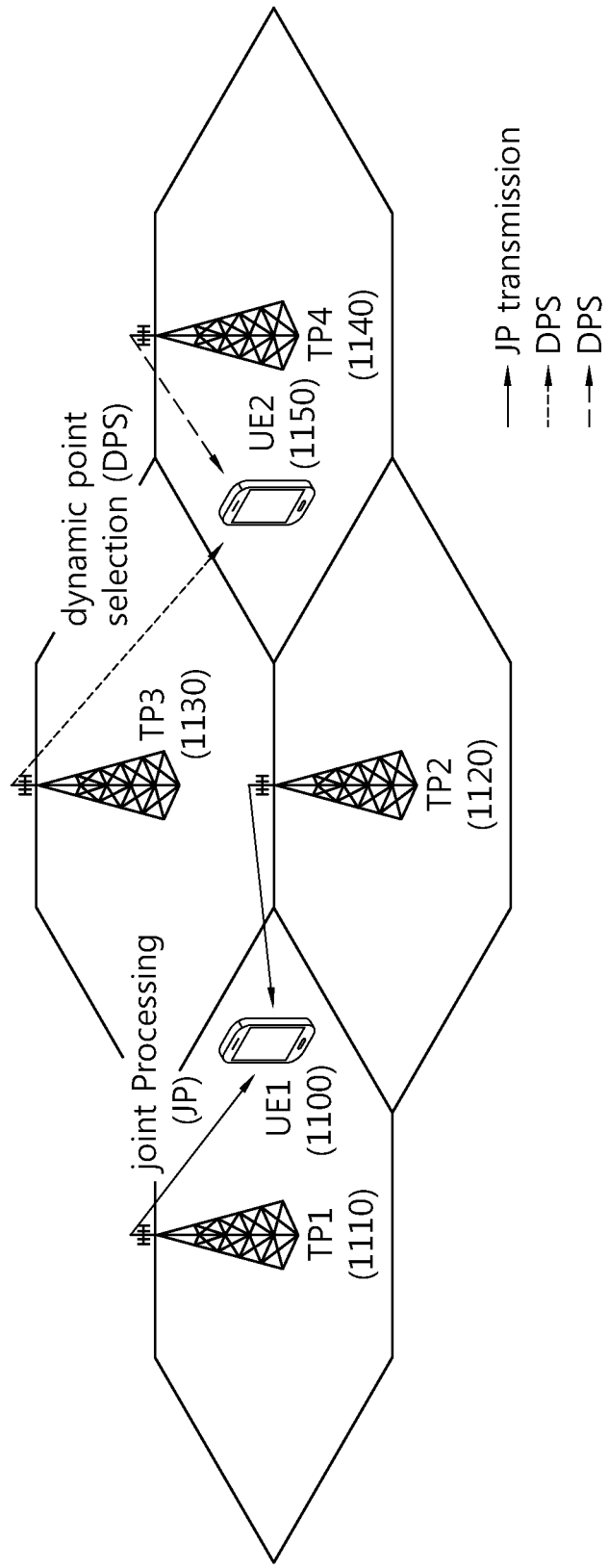
FIG. 11 shows the concept of a method of transmitting data from a plurality of transmission points to user equipment based on a coordinated multi point (CoMP).

FIG. 11 shows the concept of a method of transmitting data to user equipment based on CoMP (coordinated multi point) at multiple transmission points.

Referring to FIG. 11, traffic data and control data may be transmitted to the user equipment based on CoMP at the multiple transmission points. The multiple transmission points may generate data that is transmitted to the user equipment in the cell based on cell IDs that are the same or different from each other. The multiple transmission points may be referred to as a plurality of serving cells as well. The CoMP may transmit and receive data based on serving cells different from each other.

Transmission point 1 (1110) and transmission point 2 (1120) transmit data to the user equipment using a JT (joint transmission) scheme among CoMP schemes. In case the plurality of transmission points 1110 and 1120 transmits data to the user equipment 1100 using the JT scheme, the same data may be simultaneously transmitted from the different transmission points 1110 and 1120 to the user equipment 1100. The user equipment 1100 may receive data transmitted from the different transmission points 1110 and 1120 and may conduct demodulation.

Transmission point 3 (1130) and transmission point 4 (1140) may transmit data to the user equipment 1150 using a DPS (dynamic point selection) scheme among CoMP schemes.

In the DPS scheme, the user equipment may receive data by dynamically selecting a transmission point having a good channel among the different transmission points 1130 and 1140. For example, in case ePDCCH data is transmitted to the user equipment 1150 at a first time in the third transmission point 1130, the ePDCCH data may be transmitted to the user equipment 1150 at a second time in the second transmission point 1140.

Figure 12:
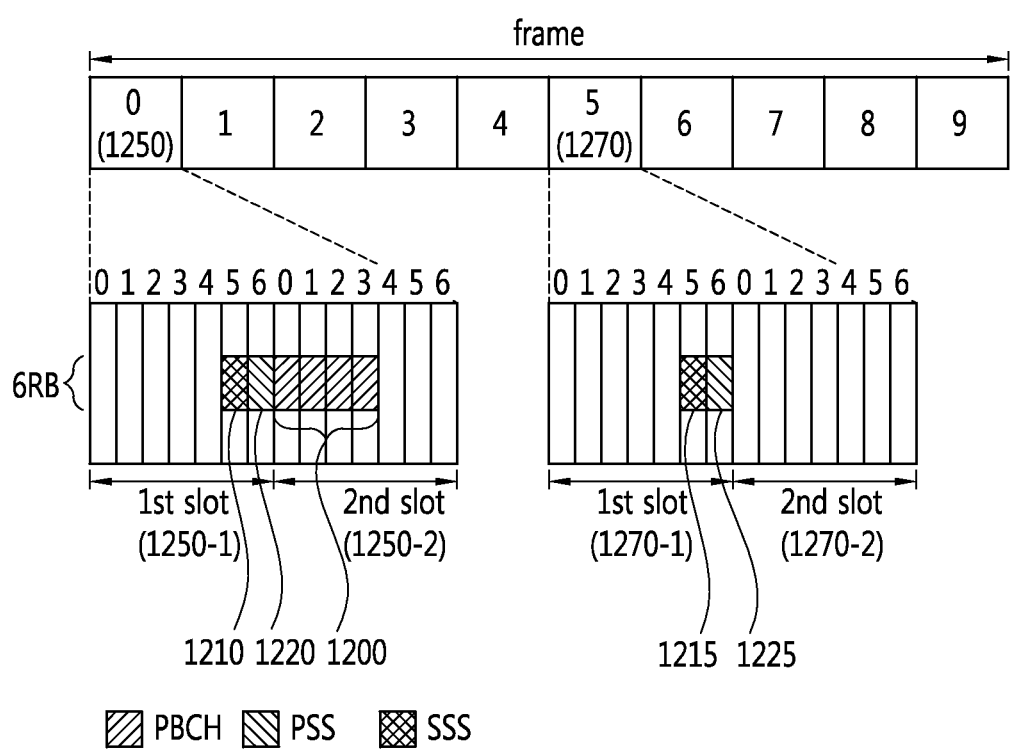
FIG. 12 shows transmission of a sync signal and PBCH data in a legacy subframe in case frequency division duplex (FDD) is used in a duplex scheme.

FIG. 12 shows transmission of a sync signal and PBCH data in a legacy subframe in case FDD (frequency division duplex) is used in a duplex scheme.

The PBCH 1200 is transmitted through the first four OFDM symbols of the second slot 1250-2 of the first subframe (index 0 subframe, 1250) in the radio frame. The PBCH 1200 carries system information necessary for the wireless device to communicate with the base station. The system information transmitted through the PBCH 1200 is referred to as a MIB (master information block). In comparison, the system information transmitted over the PDSCH indicated by the PDCCH is referred to as an SIB (system information block).

Among the OFDM symbols allocated to the first slots 1250-1 and 1270-1 of the first subframe (index 0 subframe, 1250) and the sixth subframe (index 5 subframe, 1270), the seventh OFDM symbol (index 6 OFDM symbol) may include PSSs (Primary Synchronization Signals, 1220 and 1225). The PSSs 1220 and 1225 may be used to obtain the synchronization of OFDM symbols or slots. Further, information on the physical cell IDs may be obtained through the PSSs 1220 and 1225. The PSC (primary synchronization code) is a sequence used for generating the PSSs 1220 and 1225. In the 3GPP LTE specification, three PSCs are defined. In accordance with the cell ID, one of the three PSCs is used to generate the PSSs 1220 and 1225. The user equipment may receive the PSSs 1220 and 1225, and based on the PSC, may obtain information on the cell ID.

Among the OFDM symbols allocated to the first slots 1250-1 and 1270-1 of the first subframe (index 0 subframe, 1250) and the sixth subframe (index 5 subframe, 1270), the sixth OFDM symbol (index 5 OFDM symbol) may include the SSSs (Secondary Synchronization Signals, 1220 and 1225).

The first SSS 1220 is transmitted through the sixth OFDM symbol of the first slot 1250-1 of the first subframe 1250, and the second SSS 1225 is transmitted through the sixth OFDM symbol of the first slot 1270-1 of the sixth subframe 1270. The SSSs 1220 and 1225 may be used to obtain frame synchronization. The SSSs 1220 and 1225, together with the PSSs 1210 and 1215, are used to obtain information on the cell ID.

The first SSS 1220 and the second SSS 1225 may be generated by using different SSCs (Secondary Synchronization Codes). When each of the first SSS 1220 and the second SSS 1225 includes 31 subcarriers, two SSC sequences having a length of 31 are used for the first and second SSSs 1220 and 1225, respectively.

In light of the frequency domain, the PBCH 1200, the PSSs 1210 and 1220 and the SSSs 1215 and 1225 are transmitted in the frequency bandwidth corresponding to 6 RBs with respect to the subframe.

Hereinafter, a method of transmitting a reference signal in an NCT subframe and a method of performing CoMP based on the legacy subframe and NCT subframe are described.

In the existing LTE release 8/9/10 systems, control channels and reference signals, and synchronization signals such as CRS, PSS/SSS, PDCCH, and PBCH, may be transmitted through a downlink carrier. In the systems subsequent to the LTE release 8/9/10 systems, some of channels or signals transmitted through existing legacy subframes may not be transmitted to relieve problems with interference between a plurality of cells and to enhance carrier expandability. Such subframes may be defined as extension carrier subframes or NCT subframes (new carrier subframes). For example, the NCT subframe may not include information such as PDCCH data and CRS. For example, when the NCT frame does not include the PDCCH, PDSCH of the NCT subframe may be assigned based on the EPDCCH of the NCT subframe. when the legacy subframe and NCT subframe is transmitted simultaneously to STA based on CoMP, the PDCCH of the NCT subframe may include PDSCH allocation information transmitted through the NCT subframe. In the NCT subframe, the downlink control information such as DCI may be transmitted through a channel such as EPDDCH. Since the CRS is not transmitted, DCI may be demodulated based on a reference signal such as DM-RS. A subframe configured and generated by the NCT subframe configuration and legacy subframe configuration can be a NCT subframe. For example, one slot in the subframe may be generated by channel and signal configuration of the NCT subframe and another slot in the subframe may be generated by channel and signal configuration of the legacy subframe. The NCT subframe and legacy subframe may be included in a frame transmitted by a cell. The NCT subframe and legacy subframe in a frame can be divided based on time division multiplexing (TDM) method.

In case the NCT subframe is activated, set as an S-cell, data may be transmitted to the user equipment based on the P-cell and S-cell assuming the P-cell transmits data based on the legacy subframe and the S-cell transmits data using the NCT subframe. When transmitting data to the user equipment based on the P-cell and S-cell, the base station may inform the S-cell of the position of the OFDM symbol from which the PDSCH starts in the legacy subframe through higher layer signaling. The parameter indicating the position of an OFDM symbol where the PDSCH starts in the legacy subframe is the Idatastart parameter. The Idatastart parameter may have values from 1 to 4.

The NCT frame, which includes NCT subframes, may include ten NCT subframes. The NCT frame may transmit a reference signal that performs time/frequency tracking only on a specific subframe, not on all the subframes included in the frame. The reference signal performing time/frequency tracking transmitted included in the subframe may be referred to as a TRS (tracking reference signal). The TRS may be a reference signal defined to be transmitted through a specific RE in a specific RB. Instead of a term represented as TRS, TRS may be represented by the term as enhanced synchronization signal (eSS) or reduced CRS. TRS may be transmitted via at least one specific subframe (for example, subframe 0 and subframe 5).

In the NCT subframe, PDSCH data may be transmitted without being mapped through the RE where the TRS is configured. In other words, in the NCT subframe, considering the RE where the TRS is configured, data rate matching may be performed on the PDSCH data. Another NCT subframe may be a subframe having a type of puncturing the RE where the TRS is configured.

The antenna port for transmitting the TRS may be defined as antenna port x. In case the base station transmits the TRS to the user equipment based on antenna port x, the base station may not conduct mapping on the PDSCH or EPDCCH data in the RE corresponding to antenna port x.

An initial value of the pseudo random sequence used for generating TRS may be determined based on $c_{init}=2^{10} \cdot (7 \cdot (n_s+1)+l+1) \cdot (2 \cdot N_{ID}^{cell}+1)+2 \cdot N_{ID}^{cell}+N_{CP}$. Here, $n_s$ is a slot number, l is a number of an OFDM symbol, $N_{ID}^{cell}$ is a cell identifier, and $N_{CP}$ is the length of the CP. In accordance with the type of the CP, $N_{CP}$ may have different values.

As a parameter for reducing inter-cell influence, v-shift may be used. v-shift may be used as a parameter for adjusting the position of a RE where the TRS is mapped. For example, v-shift may be determined based on $v_{shift}=N_{ID}^{cell}$ mod 6. v-shift may be a fixed value such as 0.

A subframe for transmitting the TRS of antenna port x transmitted with a specific period may be a MBSFN subframe set by a higher layer. In case the subframe for transmitting the TRS is the same as the MBSFN subframe set by the higher layer, the position of the MBSFN reference signal used in the MBSFN subframe may collide with the position of the TRS. That is, this is the case where the MBSFN subframe of NCT subframes is the same as the subframe for transmitting the TRS among the NCT subframes. In such case, the following methods may be used to transmit the TRS in the MBSFN subframe.

(1) Method 1

Assume that the transmission mode is 10 and that DCI format 2D is used as a DCI format for transmitting control data. The TRS of the NCT subframe may be used for the purpose of the user equipment's frequency tracking. In case the base station uses 10 as a transmission mode, upon performing CoMP-based transmission, only with the reference signals such as CSI-RS and DM-RS, the user equipment's frequency tracking performance may be deteriorated. Accordingly, in case the base station's transmission mode is 10, the base station may transmit the TRS to the user equipment for the purpose of frequency tracking. In other words, in case the MBSFN subframe is a subframe for transmitting the TRS, the MBSFN resources may be disregarded while the TRS set as antenna port x in the MBSFN subframe may be first included and transmitted.

In case the MBSFN subframe transmission mode is not 10, some OFDM symbols (e.g., first OFDM symbol or second OFDM symbol) may be excluded while the remaining OFDM symbols include the TRS set as antenna port x, and the TRS may be transmitted. Unless the transmission mode is 10, even when the TRS is not necessarily used for frequency tracking, relatively reliable frequency tracking performance may be attained. The OFDM symbols that are excluded from TRS transmission may be the position of OFDM symbols overlapping the MBSFN reference signal.

Transmission mode 10 in method 1 is merely an example of the transmission mode. That is, the TRS may be first transmitted in at least one transmission mode other than transmission mode 10, and such embodiment is also included in the scope of the invention.

(2) Method 2

In method 2, the TRS set as antenna port x may be included and transmitted in the remaining OFDM symbols except for some OFDM symbols irrespective of the transmission mode of the base station that transmits the MBSFN subframe. As described above, some OFDM symbols, the position where the MBSFN reference signal is transmitted, may be the position of OFDM symbols that collide with the TRS.

(3) Method 3

In method 3, regardless of the transmission mode of the MBSFN subframe, the TRS set as antenna port x may be included and transmitted. That is, in case the MBSFN reference signal overlaps the TRS regardless of the transmission mode, the TRS may be first transmitted.

(4) Method 4

In method 4, regardless of the configured transmission mode, a first slot of the MBSFN subframe may transmit TRS configured by antenna x which is allocated in a resource element where the MBSFN reference signal and TRS is colliding in the first slot. On the contrary, a second slot of the MBSFN subframe may transmit MBSFN reference signal except TRS configured by antenna x which is allocated in a resource element where the MBSFN reference signal and TRS is colliding in the second slot.

In another example of method 4, regardless of the configured transmission mode, a first slot of the MBSFN subframe may transmit TRS configured by antenna x without MBSFN reference signal. On the contrary, a second slot of the MBSFN subframe may transmit MBSFN reference signal without TRS.

(5) Method 5

In method 5, a MBSFN subframe including PMCH may not transmit TRS. A MBSFN subframe which is not including PMCH may transmit TRS.

Methods 1 to 5 described above assumes a case that a NCT subframe transmitting TRS is configured to a MBSFN subframe.

Legacy frame using a FDD as a duplexing method, subframes 1, 2, 3, 6, 7 and 8 except subframes 0, 4, 5 and 9 may be configured as a MBSFN subframe. Subframes 0, 4, 5 and 9 which is not configured as a MBSFN subframe may be used to transmit paging message by a higher layer configuration. Subframes 0 and 5 among these subframes may be used to transmit PSS/SSS, and subframe 0 may be used to transmit PBCH. Because of the reason described above, subframes 0, 4, 5, and 9 was not used as a MBSFN subframe.

However, NCT subframe may not include PBCH data or paging message. Therefore, at least one subframe among subframes 0, 4, 5, and 9 which was not used as a MBSFN subframe may be used as a MBSFN subframe.

For example, subframes 4 and/or 9 included in a NCT frame may be used as a MBSFN subframe(s). subframes 0 and/or 5 included in a NCT frame may be also used as a MBSFN subframe(s). when subframes 0 and/or 5 included in a NCT frame is configured as a MBSFN subframe, resource element(s) transmitting PSS/SSS in subframes 0 and/or 5 may not be used as resource element(s) to transmit PMCH.

Additionally, when the first slot of a subframe which is configured as a MBSFN subframe transmit TRS according to method 4 described above, the second slot of a subframe which is configured as a MBSFN may be only configured as a MBSFN subframe. In this case, CP of the first slot and CP of the second slot may be different. In other words, the first slot configured to transmit TRS adds normal CP or extended CP and the second slot adds extended CP.

Hereinafter, an embodiment of the present invention is described which is directed to a method of nulling a RE of a specific position in a legacy subframe or in the legacy subframe or NCT subframe when CoMP is performed based on a transmission point where a legacy subframe is transmitted and a transmission point where an NCT subframe is transmitted. The method of nulling the RE refers to not including specific information at the position of the RE. By nulling the RE, interference between data transmitted from a plurality of transmission points may be decreased.

It may be assumed that upon performing CoMP at a plurality of transmission points a legacy subframe is transmitted at the first transmission point and an NCT subframe is transmitted at the second transmission point. In such case, interference may occur between the control data, sync signal and reference signal transmitted through the legacy subframe at the first transmission point and the data included in the NCT subframe transmitted at the second transmission point. Hereinafter, an embodiment of the present invention is described of a method of preventing interference between the legacy subframe and the NCT subframe.

Embodiments of the present invention described below, the first transmission point assumes as a transmission point transmitting a legacy subframe, the second transmission point assumes as a transmission point transmitting an NCT subframe. However, as another embodiment of the present invention, the first transmission point and/or the second transmission point may transmit frame including a legacy subframe and an NCT subframe. In this case, the resource mapping method described below may be applied to the another embodiments of the present invention.

To facilitate transmission sync between a plurality of transmission points when performing CoMP, the CP length of carriers constituting CoMP aggregation may be set to be the same. That is, the CP length in the legacy subframe may be set to be identical to the CP length in the NCT subframe.

(1) Method of Transmitting CRS/PSS/SSS/PBCH in Legacy Subframe and PDSCH in NCT Subframe (1)-1. JT (Joint Transmission)

Assume that among CoMP schemes, a JT scheme is used to transmit data from a plurality of transmission points to the user equipment. The JT scheme may transmit data from the plurality of transmission points to the user equipment at the same time.

In case the JT scheme is used, data (e.g., PDSCH data) may not be mapped at the position of the RE of the NCT subframe corresponding to the position of the RE where control data or sync signal or reference signal is transmitted in the legacy subframe. PDSCH transmitted via the NCT subframe can be assigned by the EPDCCH included in the NCT subframe. PDCCH included in the legacy subframe also may include assigning information of the PDSCH PDSCH transmitted via the NCT subframe. For example, the NCT subframe may be generated by nulling the REs of the NCT subframe, which correspond to the RE where the CRS is transmitted in the legacy subframe, RE of subframe #0 and subframe #5 where PSS/SSS are transmitted, and RE of subframe #0 where PBCH is transmitted. Among the data of the legacy subframe, data for performing nulling in the resource region corresponding to the NCT subframe may be specified. For example, only the resource region of the NCT subframe, corresponding to the PBCH and PSS/SSS of the legacy subframe, may be nulled.

FIG. 13 shows the concept of a method of nulling an NCT subframe according to an embodiment of the present invention.

It is assumed in FIG. 13, for ease of description, that the legacy subframe includes only the PBCH 1320 and PSS 1300/SSS 1310. By nulling the RE 1350 of the NCT subframe corresponding to the position where the PBCH 1320 and PSS 1310/SSS 1300 are transmitted in the legacy subframe, the NCT subframe may be generated.

In another method, CoMP or JT may not be carried out at the time that a subframe is transmitted of transmitting specific data. For example, when the first transmission point transmits subframe #0 and subframe #5 including the PSS/SSS of the legacy subframe, the second transmission point may not transmit the NCT subframe, thereby preventing interference. The time when the second transmission point does not transmit the NCT subframe may vary.

(1)-2. DPS (Dynamic Point Selection)

Assume that among CoMP schemes, a DPS scheme is based when the first transmission point and the second transmission point transmit data. The DPS scheme is a method in which transmission times of the first and second transmission points are set to be different from each other so that data is transmitted to the user equipment at different times.

The first transmission point and the second transmission point each may transmit data to the user equipment at a different transmission time. Since in the DPS scheme different transmission times apply, a subframe generated without performing nulling on the legacy subframe and NCT subframe may be transmitted from each transmission point to the user equipment.

However, in another transmission method, even through the DPS is used, transmission timing may not be consistent between the two transmission points, and in such case, interference may occur there between. Accordingly, even in the DPS scheme, nulling may be performed on some REs of the NCT subframe and then the NCT subframe may be transmitted from the transmission point.

For example, in the resource region of the NCT subframe corresponding to the resource region where the CRS is transmitted in the legacy subframe, the NCT subframe may be generated by mapping data. On the contrary, in the resource region of the NCT subframe corresponding to the resource region mapped with PBCH/PSS/SSS, not CRS, in the legacy subframe, nulling may be performed to generate the NCT subframe. That is, when data is transmitted from a plurality of transmission points based on DPS, an NCT subframe obtained by performing nulling on a specific resource region in the transmission point that transmits the NCT subframe may be transmitted to the user equipment.

(2) Method of Transmitting CRS in Legacy Subframe and TRS in NCT Subframe (2)-1. JT Upon use of JT, the transmission point of transmitting the NCT subframe may generate the NCT subframe that has performed nulling without mapping PDSCH data to the RE of the NCT subframe corresponding to the CRS of the legacy subframe.

Further, the transmission point of transmitting the legacy subframe may generate the legacy subframe, not mapping the PDSCH data to the RE of the legacy subframe corresponding to the TRS of the NCT subframe upon generation of the legacy subframe.

In other words, in case the legacy subframe is different in v-shift value from the NCT subframe, the NCT subframe is a subframe obtained by nulling the RE corresponding to the CRS of the legacy subframe and the legacy subframe may be a subframe obtained by nulling the RE corresponding to the TRS of the NCT subframe.

FIG. 14 shows the concept of a method of nulling a legacy subframe and an NCT subframe according to an embodiment of the present invention.

In FIG. 14, any positions have been assigned to the CRS 1450 and TRS 1400 for purposes of description, and the CRS 1450 and TRS 1400 may be positioned in other resource region.

The legacy subframe may be generated by performing nulling on the position of the TRS 1400 of the NCT subframe. The NCT subframe may be generated by performing nulling on the position of the CRS 1450 in the legacy subframe.

(2)-2. DPS

Upon use of DPS, each transmission point may transmit a subframe generated with performing nulling on the legacy subframe and NCT subframe to the user equipment. However, even upon using DPS, nulling on the legacy subframe and NCT subframe may be carried out. For example, a legacy subframe may be generated which is obtained by nulling the resource region that is at the position corresponding to the TRS of the NCT subframe when generating a legacy subframe. As another example, when generating an NCT subframe, an NCT subframe may be generated which is obtained by nulling the resource region that is at the position corresponding to the CRS of the legacy subframe.

(3) Method of Transmitting PDSCH Position Information of NCT Subframe and PDCCH in Legacy Subframe (3)-1. JT Upon use of JT, the information on the position of the OFDM symbol from which PDSCH data starts in the legacy subframe and NCT subframe may be transmitted based on Idatastart parameter or a newly defined parameter, Idatastartcomp.

(3)-2. DPS

Upon use of DPS, like JT, information on the position of the OFDM symbol where PDSCH data starts in the legacy subframe and NCT subframe may be transmitted based on Idatastart parameter or a newly defined parameter, Idatastartcomp. The position of the OFDM symbol corresponding to PDCCH may be transmitted in the legacy subframe through the value of the PCFICH.

(4) PDCCH in Legacy Subframe and TRS of NCT Subframe

In the data transmission through JT and DPS, the transmission may be conducted without considering interference between the data of the legacy subframe and the TRS of the NCT subframe. The above-described method of performing nulling on the resource region for the PDCCH of the legacy subframe based on the TRS of the NCT subframe or method of performing nulling on the resource region of the NCT subframe considering the reference signal of the legacy subframe or control data may not be considered. That is, the legacy subframe and NCT subframe not performing nulling may be transmitted form each transmission point to the user equipment.

(5) PDCCH in Legacy Subframe and PSS/SSS of NCT Subframe

The resource region where PSS/SSS are transmitted in the NCT subframe may differ from the resource region where PSS/SSS are transmitted in the legacy subframe.

(5)-1. JT

Upon use of JT, PDSCH data may not be transmitted in the resource region of the legacy subframe corresponding to the resource region where PSS/SSS are transmitted in the NCT subframe. In another method, the legacy subframe may not be transmitted to the user equipment at the time that the NCT subframe is transmitted where PSS/SSS is transmitted, among NCT subframes.

FIG. 15 shows the concept of a method of nulling a legacy subframe according to an embodiment of the present invention.

The position of the PSS/SSS 1500 of the NCT subframe as shown in FIG. 15 is arbitrary, and may vary.

Referring to FIG. 15, the legacy subframe may be generated by nulling the resource region 1550 that is at the position corresponding to the PSS/SSS 1500 in the NCT subframe.

(5)-2. DPS

Upon use of DPS, although each transmission point may transmit a subframe generated without performing nulling on the legacy subframe and the NCT subframe to the user equipment, even when DPS is used, nulling may also be performed on the subframe by the same method as applies when JT is performed. For example, the legacy subframe may null the resource region corresponding to the resource region where PSS/SSS are transmitted in the NCT subframe. The legacy subframe for performing nulling may be a legacy subframe that performs transmission at a transmission time adjacent to the transmission time of the NCT subframe transmitting the PSS/SSS.

(6) PSS/SSS of Legacy Subframe and PSS/SSS of NCT Subframe (6)-1. JT

The first transmission point may generate an NCT subframe by nulling the resource region corresponding to the PSS/SSS of the legacy subframe among resource regions of the NCT subframe and may transmit it to the user equipment. The second transmission point may generate a legacy subframe by nulling the resource region corresponding to the PSS/SSS of the NCT subframe among the resource regions of the legacy subframe and may transmit it to the user equipment.

In another method, when the first transmission point transmits a legacy subframe including the PSS/SSS, the second transmission point may not transmit the NCT subframe to the user equipment. In contrast, when the second transmission point transmits the NCT subframe including the PSS/SSS, the first transmission point may not transmit the legacy subframe to the user equipment.

(6)-2. DPS

Upon use of DPS, each transmission point may transmit a subframe generated without performing nulling the legacy subframe and the NCT subframe to the user equipment. However, the nulled subframe may be transmitted to the user equipment by the same method as applies to JT. That is, the first transmission point may generate a NCT subframe by nulling the resource region corresponding to the PSS/SSS of the legacy subframe among resource regions of the NCT subframe and may transmit it to the user equipment. The second transmission point may generate a legacy subframe by nulling the resource region corresponding to the PSS/SSS of the NCT subframe among the resource regions of the legacy subframe and may transmit it to the user equipment. The subframe performing nulling in the DPS may be an NCT subframe with a transmission time adjacent to the transmission time of the legacy subframe transmitting the PSS/SSS or a legacy subframe with a transmission time adjacent to the transmission time of the NCT subframe transmitting the PSS/SSS.

Figure 16:
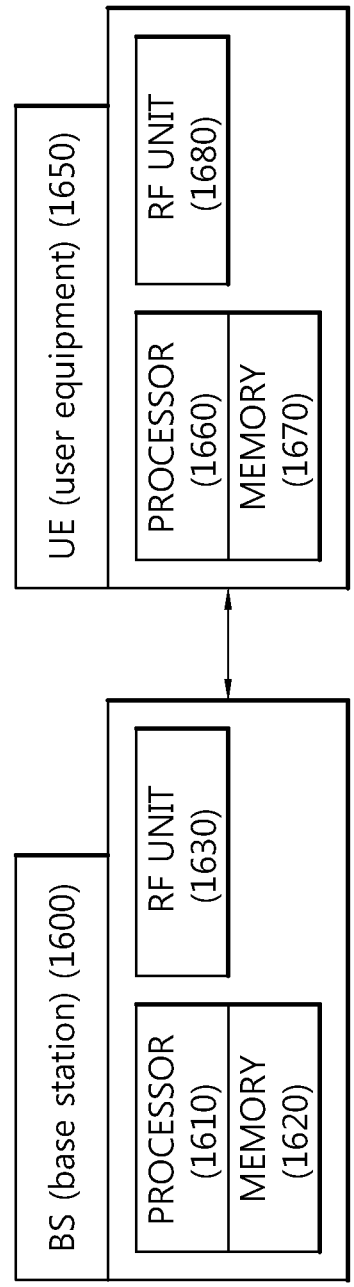
FIG. 16 is a block diagram illustrating a wireless communication system according to an embodiment of the present invention.

FIG. 16 is a block diagram illustrating a wireless communication system according to an embodiment of the present invention.

Referring to FIG. 16, the base station 1600 includes a processor 1610, a memory 1620, and a RF (radio frequency) unit 1630. The memory 1620 is connected to the processor 1610 and stores various types of information for driving the processor 1610. The memory 1620 is connected to the processor 1610 and transmits and/or receives radio signals. The processor 1610 implements the suggested functions, processes, and/or methods. In the above-described embodiments, the operation of the base station may be realized by the processor 1610.

For example, the processor 1610 may determine the size of a frequency band where the CRS is transmitted in consideration of the size of the entire system bandwidth.

The wireless device 1650 includes a processor 1660, a memory 1670, and a RF unit 1680. The memory 1670 is connected to the processor 1660 and stores various types of information for driving the processor 1660. The RF unit 1680 is connected to the processor 1660 and transmits and/or receives radio signals. The processor 1660 implements the suggested functions, processes, and/or methods. In the above-described embodiments, the operation of the wireless device may be realized by the processor 1660.

For example, the processor 1660 may determine the size of the frequency band where the CRS is transmitted in consideration of the size of the entire system bandwidth.

The process may include ASICs (application-specific integrated circuits), other chipsets, logic circuits, and/or data processing devices. The memory may include ROMs (read-only memories), RAMs (random access memories), flash memories, memory cards, storage media and/or other storage devices. The RF unit may include base band circuits for processing radio signals. When the embodiment is implemented in software, the above-described schemes may be implemented in modules (processes, functions, etc.) that perform the above-described functions. The modules are stored in the memory and executed by the processor. The memory may be positioned in or outside the processor and may be connected to the processor via a well-known means.

Although in the above-exemplary systems, the methods are described based on flowcharts with a series of steps or blocks, the present invention is not limited to the order thereof, and some steps may be conducted simultaneously or in an order different from other steps. It will be understood by those of ordinary skill in the art that the steps in each flowchart do not exclude each other and one or more thereof may be deleted without affecting the scope of the present invention.

The invention claimed is:

1. A method of receiving data from a plurality of serving cells, the method comprising:

receiving, by a user equipment (UE), a cell-specific reference signal (CRS) in a first subframe from a first serving cell; and receiving, by the UE, PDSCH (physical downlink shared channel) data on a PDSCH in a second subframe from a second serving cell, wherein the second subframe does not map the PDSCH data to a second resource element (RE) corresponding to a first RE of the first subframe mapped with the CRS in order to decrease interference between the first subframe transmitted from the first serving cell and the second subframe transmitted from the second serving cell, wherein the CRS is generated from a pseudo random sequence that is initiated by a cell identifier of the first serving cell, wherein the PDSCH is indicated by an enhanced physical downlink shared channel (EPDCCH) of the second subframe, and wherein the second RE of the second subframe and the first RE of the first subframe overlap in a time domain and in a frequency domain.

2. The method of claim 1, further comprising:

receiving, by the UE, a sync signal in the first subframe from the first serving cell, wherein the second subframe does not map the PDSCH data to a RE corresponding to a RE of the first subframe mapped with the sync signal, wherein the first subframe is a first subframe of a radio frame, wherein the sync signal is transmitted in a first slot of the first subframe, and wherein the RE of the first subframe mapped with the sync signal is sixth and seventh orthogonal frequency division multiplexing (OFDM) symbols in a frequency band corresponding to middle six resource blocks (RBs).

3. The method of claim 1, further comprising:

receiving, by the UE, physical broadcast channel (PBCH) data in the first subframe from the first serving cell, wherein the second subframe does not map the PDSCH data to a RE corresponding to a RE of the first subframe mapped with the PBCH data, wherein the first subframe is a first subframe of a radio frame, wherein the PBCH data is transmitted in a second slot of the first subframe, and wherein the RE of the first subframe mapped with the PBCH data is sixth and seventh orthogonal frequency division multiplexing (OFDM) symbols in a frequency band corresponding to middle six resource blocks (RBs).

4. The method of claim 1, further comprising:

receiving, by the UE, a tracking reference signal (TRS) in the second subframe from the second serving cell, wherein the first subframe does not map downlink data to a RE corresponding to a RE of the second subframe mapped with the TRS, and wherein the TRS is a reference signal generated through a pseudo random sequence with an initial value determined based on a cell identifier (ID) and a type of a cyclic prefix (CP).

5. The method of claim 1, further comprising:

receiving, by the UE, a sync signal in the second subframe from the second serving cell, wherein the first subframe does not map downlink data to a RE corresponding to a RE of the second subframe mapped with the sync signal.

6. A user equipment (UE) receiving data from a plurality of serving cells in a wireless communication system, the UE comprising a processor configured to:

receive a cell specific reference signal (CRS) in a first subframe from a first serving cell and receive physical downlink shared channel (PDSCH) data on a PDSCH in a second subframe from a second serving cell, wherein the second subframe does not map the PDSCH data to a second resource element (RE) corresponding to a first RE of the first subframe mapped with the CRS in order to decrease interference between the first subframe transmitted from the first serving cell and the second subframe transmitted from the second serving cell, wherein the CRS is generated from a pseudo random sequence that is initiated by a cell identifier of the first serving cell, wherein the PDSCH is indicated by an enhanced physical downlink shared channel (EPDCCH) of the second subframe, and wherein the second RE of the second subframe and the first RE of the first subframe overlap in a time domain and in a frequency domain.

7. The UE of claim 6, wherein the processor further configured to:

receive a sync signal in the first subframe from the first serving cell, wherein the second subframe does not map the PDSCH data to a RE corresponding to a RE of the first subframe mapped with the sync signal, wherein the first subframe is a first subframe of a radio frame, wherein the sync signal is transmitted in a first slot of the first subframe, and wherein the RE of the first subframe mapped with the sync signal is sixth and seventh OFDM orthogonal frequency division multiplexing (OFDM) symbols in a frequency band corresponding to middle six resource blocks (RBs).

8. The UE of claim 6, wherein the processor further configured to:

receive physical broadcast channel (PBCH) data in the first subframe from the first serving cell, wherein the second subframe does not map the PDSCH data to a RE corresponding to a RE of the first subframe mapped with the PBCH data, wherein the first subframe is a first subframe of a radio frame, wherein the PBCH data is transmitted in a second slot of the first subframe, and wherein the RE of the first subframe mapped with the PBCH data is sixth and seventh orthogonal frequency division multiplexing (OFDM) symbols in a frequency band corresponding to middle six resource blocks (RBs).

9. The UE of claim 6, wherein the processor further configured to:

receive a tracking reference signal (TRS) in the second subframe from the second serving cell, wherein the first subframe does not map downlink data to a RE corresponding to a RE of the second subframe mapped with the TRS, and wherein the TRS is a reference signal generated through a pseudo random sequence with an initial k value determined based on a cell identifier (ID) and a type of a cyclic prefix (CP).

10. The UE of claim 6, wherein the processor further configured to receive a sync signal in the second subframe from the second serving cell, and wherein the first subframe does not map downlink data to a RE corresponding to a RE of the second subframe mapped with the sync signal.

* * * * *